(12) United States Patent
Wolff et al.

(10) Patent No.: US 10,775,160 B2
(45) Date of Patent: *Sep. 15, 2020

(54) SYSTEM AND METHOD FOR EFFICIENT SURFACE MEASUREMENT USING A LASER DISPLACEMENT SENSOR

(71) Applicant: Cognex Corporation, Natick, MA (US)

(72) Inventors: Robert A. Wolff, Sherborn, MA (US); Michael C. Moed, Hopkinton, MA (US); Mikhail Akopyan, Sudbury, MA (US); Robert Tremblay, Grafton, MA (US); Willard Foster, Newton, MA (US); Aaron S. Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,348

(22) Filed: Aug. 6, 2018

(65) Prior Publication Data

US 2019/0265027 A1 Aug. 29, 2019

Related U.S. Application Data

(60) Continuation of application No. 15/456,676, filed on Mar. 13, 2017, now Pat. No. 10,041,786, which is a (Continued)

(51) Int. Cl.
*G01B 11/25* (2006.01)
*G01B 11/02* (2006.01)
(Continued)

(52) U.S. Cl.
CPC ........ *G01B 11/2522* (2013.01); *G01B 11/026* (2013.01); *G06K 9/2081* (2013.01);
(Continued)

(58) Field of Classification Search
USPC .................................. 382/100, 106, 141, 108
See application file for complete search history.

(56) References Cited

U.S. PATENT DOCUMENTS

| 5,627,635 A | * | 5/1997 | Dewan | ................. | G01B 11/026 |
| | | | | | 250/201.6 |
| 5,745,176 A | | 4/1998 | Lebens | | |

(Continued)

FOREIGN PATENT DOCUMENTS

| CN | 102494675 | 6/2012 |
| DE | 102005051318 | 5/2007 |

(Continued)

OTHER PUBLICATIONS

Cognex, "MVS-8100D and CDC Cameras Hardware Manual", Oct. 2006, Publisher: Cognex Corporation, Published in: US.

(Continued)

*Primary Examiner* — Ishrat I Sherali
(74) *Attorney, Agent, or Firm* — Loginov & Associates, PLLC; William A. Loginov

(57) ABSTRACT

This invention provides a system for measuring displacement of an object surface having a displacement sensor that projects a line on the object surface and receives light from the projected line at an imager in a manner defines a plurality of displacement values in a height direction. A vision system processor operates on rows of imager pixels to determine a laser line center in columns of imager pixels in each of a plurality of regions of interest. Each region of interest defines a plurality of rows that correspond with expected locations of the projected line on the object surface. A GUI can be used to establish the regions. In further embodiments, the system generates grayscale images with the imager. These grayscale images can be compared to a generated height image to compensate for contrast-induced false (Continued)

height readings. Imager pixels can be compared to a reference voltage to locate the line.

16 Claims, 18 Drawing Sheets

Related U.S. Application Data division of application No. 14/149,774, filed on Jan. 7, 2014, now Pat. No. 9,605,950.

(60) Provisional application No. 61/826,416, filed on May 22, 2013.

(51) Int. Cl.
| | | |
|---|---|---|
| *G06T 7/73* | (2017.01) | |
| *G06K 9/20* | (2006.01) | |
| *G06K 9/32* | (2006.01) | |
| *G06T 5/00* | (2006.01) | |
| *G05B 15/02* | (2006.01) | |

(52) U.S. Cl.
CPC ............ *G06K 9/3233* (2013.01); *G06T 5/005* (2013.01); *G06T 7/74* (2017.01); *G05B 15/02* (2013.01); *G06T 2200/24* (2013.01); *G06T 2207/20072* (2013.01)

(56) References Cited

U.S. PATENT DOCUMENTS

| | | | |
|---|---|---|---|
| 6,064,759 A * | 5/2000 | Buckley | G01B 11/024 348/125 |
| 6,252,659 B1 | 6/2001 | Norita | |
| 6,600,168 B1 | 7/2003 | Geng | |
| 6,730,926 B2 * | 5/2004 | Boillot | G01V 8/22 250/559.19 |
| 6,819,358 B1 | 11/2004 | Kagle | |
| 6,839,144 B2 * | 1/2005 | Okada | G01B 11/25 356/606 |
| 6,956,963 B2 | 10/2005 | Ulrich | |
| 7,109,826 B2 | 9/2006 | Ginsburg | |
| 7,113,652 B2 | 9/2006 | Reiners | |
| 7,171,037 B2 | 1/2007 | Mahon | |
| 7,313,271 B2 | 12/2007 | Tan | |
| 7,352,892 B2 | 4/2008 | Zhang | |
| 8,103,085 B1 | 1/2012 | Zadeh | |
| 8,107,685 B2 * | 1/2012 | Matsunaga | G01B 11/024 382/106 |
| 8,228,315 B1 | 7/2012 | Starner | |
| 8,244,402 B2 | 8/2012 | Wells | |
| 8,294,905 B2 * | 10/2012 | Yamakawa | G01B 11/02 356/614 |
| 8,427,632 B1 | 4/2013 | Nash | |
| 8,456,646 B2 | 6/2013 | Cronk | |
| 9,488,469 B1 * | 11/2016 | Michael | G01B 11/25 |
| 9,554,094 B1 * | 1/2017 | Chiang | H04N 7/18 |
| 9,605,950 B2 * | 3/2017 | Wolff | G06T 5/005 |
| 10,041,786 B2 * | 8/2018 | Wolff | G06T 7/74 |
| 10,113,870 B2 * | 10/2018 | McGarry | G01C 11/025 |
| 10,509,977 B2 * | 12/2019 | Johannesson | G06K 9/2054 |
| 2004/0184653 A1 | 9/2004 | Baer | |
| 2004/0246473 A1 | 12/2004 | Hermary | |
| 2006/0261255 A1 | 11/2006 | Raynor | |
| 2010/0123904 A1 * | 5/2010 | Yamakawa | G01B 11/02 356/614 |
| 2010/0302554 A1 * | 12/2010 | Keshavmurthy | G01B 11/2531 356/620 |
| 2011/0310399 A1 | 12/2011 | Keshavmurthy | |
| 2012/0063672 A1 * | 3/2012 | Gordon | G06K 9/209 382/154 |
| 2014/0294284 A1 | 10/2014 | Bryll | |
| 2017/0140537 A1 * | 5/2017 | Jia | G06K 9/6201 |
| 2017/0299380 A1 | 10/2017 | Wolff | |
| 2018/0203249 A1 * | 7/2018 | Filhaber | G02B 27/30 |

FOREIGN PATENT DOCUMENTS

| | | |
|---|---|---|
| DE | 102005052044 | 5/2007 |
| DE | 102006004060 | 8/2007 |
| DE | 102006036586 | 2/2008 |
| DE | 202012104890 | 3/2013 |
| WO | 9523346 | 8/1995 |

OTHER PUBLICATIONS

Micro-Epsilon, "scanCONTROL 3D-View 2.3 Instruction Manual".
Model Human Processor, retrieved from the Internet Apr. 12, 2016. Retrieved from URL: <http://web.cs.wpi.edu/ dcb/courses/CS3041/ Model-Human.jpg>. Mon Nov. 2, 2018:23:29 EST 2009.
Wang Shu, "Reconstruction of Laser Vision Online Measurement Data", Chinese Master's Theses Full-text Database, Information Science and Technology, Issue 3, (Sep. 15, 2007).
Wei et al., Visual Location System for Placement Machine based on Machine Vision, 2008 Fifth IEEE, International Symposium on Embedded Computing, 1-15.

\* cited by examiner

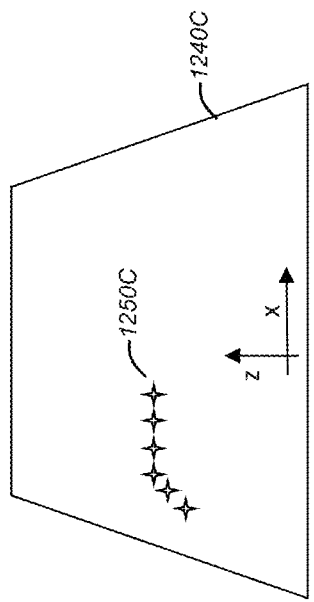
FIG. 12D
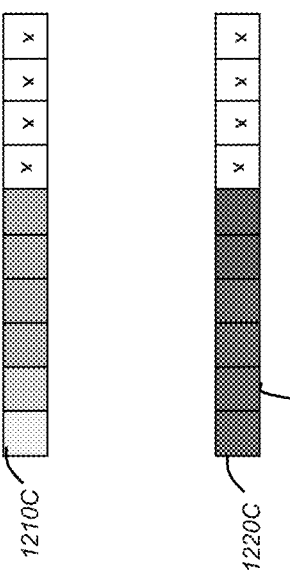
FIG. 12C
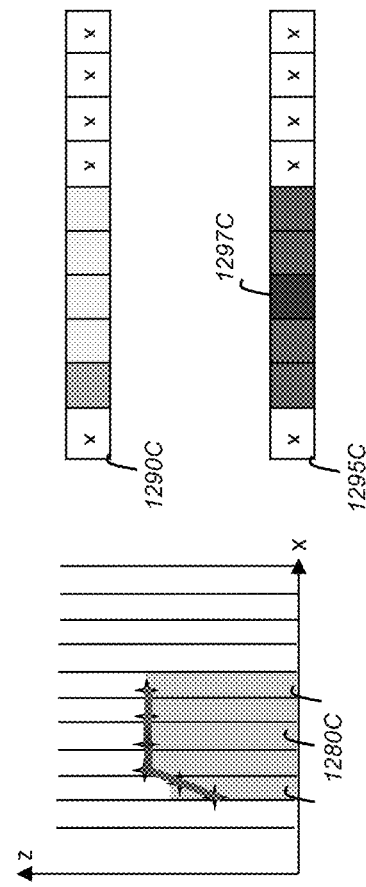
FIG. 12G
FIG. 12F
FIG. 12E

SYSTEM AND METHOD FOR EFFICIENT SURFACE MEASUREMENT USING A LASER DISPLACEMENT SENSOR

RELATED APPLICATIONS

This application is a continuation of co-pending U.S. patent application Ser. No. 15/456,676, filed Mar. 13, 2017, entitled SYSTEM AND METHOD FOR EFFICIENT SURFACE MEASUREMENT USING A LASER DISPLACEMENT SENSOR which application is a divisional of U.S. patent application Ser. No. 14/149,774, filed Jan. 7, 2014, issued as U.S. Pat. No. 9,605,950 on Mar. 28, 2017, entitled SYSTEM AND METHOD FOR EFFICIENT SURFACE MEASUREMENT USING A LASER DISPLACEMENT SENSOR, which application claims the benefit of U.S. Provisional Application Ser. No. 61/826,416, filed May 22, 2013, entitled SYSTEM AND METHOD FOR EFFICIENT SURFACE MEASUREMENT USING A LASER DISPLACEMENT SENSOR, the entire disclosure of each of which applications is herein incorporated by reference.

FIELD OF THE INVENTION

This invention relates to machine vision systems used in determining the displacement of an imaged object surface in three dimensions (3D).

BACKGROUND OF THE INVENTION

In manufacturing and assembly processes, it is often desirable to measure some or all of an object surface with a high degree of accuracy and generate a map of the overall displacement or "profile" (e.g. height in the physical z-coordinate direction) with respect to various locations on the object surface. This profile can be determined using a machine vision system (also termed herein "vision system") in the form of a laser displacement sensor (also termed a laser beam "profiler"). A laser displacement sensor captures and determines the (three dimensional) profile of a scanned object surface using a planar curtain formed by optically spreading a laser beam in a "fan" transverse to the beam propagation path. In a conventional arrangement, a vision system camera assembly is oriented to view the plane of the beam from outside the plane. This arrangement captures the profile of the projected line (e.g. extending along the physical x-axis) on the object surface, which, due to the baseline (i.e. the relative spacing along the y-axis) between the beam (fan) plane and the camera causes the imaged line to appear as varying in the image y-axis direction as a function of the physical z-axis height of the imaged point (along the image x-axis). In a typical arrangement the camera optical axis intersects the laser plane at an acute angle and the well-known Scheimpflug configuration of the laser plane, camera lens, and camera image sensor can be used to form an image in which the laser beam deviation is in focus through the region of interest despite the varying distance from the camera. This deviation represents the height profile of the surface. Laser displacement sensors are useful in a wide range of inspection and manufacturing operations where the user desires to measure and characterize surface details of a scanned object via triangulation. One form of laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens.

In a typical arrangement, the displacement sensor and/or object are in relative motion (usually in the physical y-coordinate direction) so that the object surface is scanned by the camera, and a sequence of images are acquired of the laser line at desired spatial intervals—typically in association with an encoder or other motion measurement device (or, alternatively, at time based intervals). Each of these single profile lines is typically derived from a single acquired image of a larger field of view that is known to contain the projected line. These lines collectively describe the surface of the imaged object. The field of view is characterized by a working distance—that is, the surface of the object should reside between a maximum and minimum height to appropriately capture profile information. Within this working distance, the size and shape of the line can vary based upon a variety of factors, including the orientation and reflectivity of the surface being scanned, the varying thickness of the laser plane (the line is typically narrowest at a "waist" at some intermediate depth from the sensor, and wider both closer to and farther from the sensor), and the varying amount of magnification and foreshortening in the camera system as a function of height. This variation in line size/geometry poses one of several challenges in obtaining an accurate measurement of a surface at a desired scanning speed.

In measuring an object surface profile, it is sometimes desirable to simultaneously generate a grayscale image of the object. While such grayscale images can provide a view of the object, the grayscale images may have differing characteristics that can prevent a useful comparison between it and the derived object surface profile. For example, the grayscale image and other images generated may have different pixel scales. In this regard, if an object in physical space is further from a camera, e.g., at a lower height, then a pixel can appear wider and cover more physical space than an object closer to the camera. This effect can cause distortion in the resulting grayscale image and can prevent or make difficult a comparison between the grayscale image and other images generated during the process. It is therefore desirable for the grayscale images to have uniform pixel scales, both within a single grayscale image and among separate grayscale images.

Machine vision applications often require the use of the highest quality imaging components. In recent times, the cost of imaging equipment, such as cameras, has increased. As a result, those in the market may be forced to choose between paying the ever-increasing costs for the highest quality of components or to accept lesser quality imaging equipment at a lower cost. Such lesser quality equipment often includes defects or irregularities that make it less desirable for use in than the use higher quality equipment. The use of such lesser quality equipment can potentially degrade the results of machine vision applications. In particular, sensors can often have one or more bad sensing elements. Bad sensing elements may be "stuck" in that they do not respond significantly to illumination at all, but show an approximately constant value. Other bad sensing elements may respond to illumination, but with one or more parameters of the response, such as offset, gain, nonlinearity, or noise level being significantly different from the nominal response of "good" elements.

SUMMARY OF THE INVENTION

This invention overcomes disadvantages of the prior art, in illustrative embodiment by providing a laser displacement sensor system, and corresponding methods for scanning the height profile of an object surface, which increases scanning throughput, processing speed, efficiency and versatility of the system. In an illustrative embodiment, a displacement sensor projects a line on the object surface and receives light from the projected line at an imager in a manner defines a plurality of displacement values in a height direction. A vision system processor operates on rows of imager pixels to determine a laser line center, or more generally, the position of the laser line and/or specified portions of the line (e.g. the stop and start points of the line thickness) in columns of imager pixels in each of a plurality of regions of interest. Rows in areas outside the regions of interest are typically not acquired and/or processed so that the overall speed of acquiring and processing an image of the line is increased. Each region of interest defines a plurality of rows that correspond with expected locations of the projected line on the object surface. A height image is generated from the locations of the projected laser line in each scanned image as the object moves relative to the imager field of view. A GUI can be used to establish the regions, in which the user enters numerical (physical unit) or graphical boundaries to each region. In further embodiments, the system uses line width, intensity, and position to generate grayscale information (e.g. along each laser line of the scan), or full grayscale images, with the imager and laser illumination. The grayscale image data and height image data can be used in conjunction with each other to generate correction factors that compensate for contrast-induced false height readings. Illustratively, imager pixels can also be transmitted to the processor in a "binary" manner by comparing each pixel intensity ("intensity" defined as including, but not limited to, a voltage value) in each column of the imager directly to a reference intensity. Those pixels that meet or exceed the reference intensity are provided with a logical 1 (or other) value and those that fall below the threshold are provided with a logical 0 (or other) value. The line "center" is determined in each column from a likely grouping of "1" pixels, and that location is forwarded to the processor to form part of the height image. Illustratively, the center can be a physical center of the line or any other convenient specified location associated with the line, such as the start and end points.

In an illustrative embodiment, a system and method for measuring displacement of an object surface includes a displacement sensor that projects a line on the object surface and receives light from the projected line at an imager in a manner that defines a plurality of displacement values in a height direction. A vision system processor operates to process rows of imager pixels to determine a position of the projected line in columns of the imager pixels exclusively in each of a plurality of regions of interest. Each of the regions of interest respectively defines a plurality of rows of imager pixels that correspond with expected locations of the projected line on the object surface. A location of the position of the projected line in each of the columns corresponds to a physical displacement value on the object surface. Illustratively, the object and the displacement sensor are in relative motion, and a plurality of acquired images are acquired of the projected line. The acquired images define an overall height image of the object surface. A graphical user interface (GUI) is operatively connected to the vision system processor. It enables a user to enter boundaries of each of the regions of interest. The GUI provides inputs for numerical physical units of the boundaries. Illustratively, the GUI can display an acquired image of the object with the projected line contained therein. This GUI is constructed and arranged to allow graphical positioning of the boundaries by the user. The acquired image is movable in the GUI to determine a range of displacement of the projected line during a scan. In embodiments, the position of the projected line is located at an approximate center along a column direction. In embodiments, a measurement process analyzes acquired image data in each of the plurality of regions of interest to generate information for use in a downstream processing task. The information used in the downstream processing task is generated from a combination of analyzed acquired image data from the plurality of regions of interest. The downstream processing task can employ information from at least one of a single acquired image of the object (a slice), a plurality of acquired images of the object (a group of slices), and all of the acquired images corresponding to the object (an overall height image). The downstream processing task can comprise a vision system task or tool of custom or conventional design. The vision system task or tool can comprise at least one of a registration, inspection, alignment and pattern-matching. Other tasks/tools can include smoothing, averaging, other image processing operations, etc., which can be performed, for example, on a group of slices. Illustratively, the downstream processing task includes a decision-making task. This decision-making task can be constructed and arranged to perform at least one of an object rejection, line control or alert process. The measurement process can employ a single scan of the object or a predetermined number of scans in a group (such as in smoothing, averaging, other image processing operations, In another illustrative embodiment, a system and method for measuring displacement of an object surface includes a displacement sensor that projects a line on the object surface and receives light from the projected line at an imager in a manner defines a plurality of displacement values in a height direction. A vision system processor operates to process rows of imager pixels to determine a position of the projected line in columns of the imager pixels. The vision system processor is constructed and arranged to generate, from the position of the projected line, a height image of the object surface. The vision system processor is also constructed and arranged to generate, from the intensity values of the projected line, a grayscale image of the object surface. The vision system processor is constructed and arranged to employ measurements in the grayscale image to compute and apply correction factors to the height image so as to compensate for errors in the height image. The errors can comprise false height readings in the height image, such as encountered at a contrast change on the surface—for example where a printed character or symbol is provided in a contrasting shade or color. In embodiments, a measurement process employs (a) measurements of data from the height image to construct measurements of the grayscale image, or (b) measurements of the grayscale image to construct measurements of the height image. A decision-making process can also be provided, which generates decisions based upon the measurement process.

In yet another illustrative embodiment, a system for measuring displacement of an object surface comprises a displacement sensor that projects a line on the object surface and receives light from the projected line at an imager in a manner that defines a plurality of displacement values in a height direction. A threshold circuit receives respective intensity values from pixels of the imager and performs a comparison of the respective intensity values to a reference intensity. A binary value is thereby assigned to each of the pixels based upon the comparison. A vision system processor operates to process rows of the pixels to determine a position of the projected line in columns of the pixels having a binary value indicating presence of the projected line, the vision system processor being constructed and arranged to generate a height image from the position of the projected line in the columns of the pixels. Illustratively, the intensity is defined as one of either a voltage or a current.

In yet another illustrative embodiment, a system for correcting a suspect pixel in a grayscale image, comprises a processor and a memory including instructions thereon that, when executed by the processor, cause the processor to generate laser line position data and corresponding laser line intensity data based in part on an acquired image of an object, where the laser line position data comprises at least one laser line position datum. The processor can identify at least one laser line position datum and substitute, using the processor, an original value of the laser line intensity datum corresponding to the identified laser line position datum with a substitute value for the laser line intensity datum. The processor can generate the grayscale image from the laser line position data and corresponding substituted laser line intensity data.

In yet another illustrative embodiment, a system for generating a uniformly scaled grayscale image corresponding to a height image comprises a processor and a memory including instructions thereon that, when executed by the processor, cause the processor to generate laser line position data and laser line intensity data, each pixel of the laser line intensity data including an indicia corresponding to a measured intensity. The processor can map each pixel of the laser line position data into a coordinate system representing a physical space, at least two of the mapped pixels having a connection feature disposed therebetween, the connection feature including indicia corresponding to the measured intensity, The processor can compute, with the processor, a representative position value and a representative indicia value for a plurality of bins, each of the plurality of bins corresponding to one or more of the mapped pixels and a portion of the connection feature. The processor can output the uniformly scaled grayscale image using the representative indicia values and outputting a height image using the representative position values.

In yet another illustrative embodiment, a system for measuring displacement of an object surface comprises a displacement sensor that projects a line on the object surface and receives light from the projected line at an imager in a manner that defines laser line position data and laser line intensity data. A vision system processor can be constructed and arranged to generate a height image from the laser line position data, a grayscale image from the laser line position data and the laser line intensity data, and an estimate of the grayscale image gradient, the grayscale image gradient being used to compute a height correction factor to be applied to each pixel of the height image.

BRIEF DESCRIPTION OF THE DRAWINGS

The invention description below refers to the accompanying drawings, of which:

FIG. 12C is a diagram of laser line position data and laser line intensity data;

FIG. 12D is a diagram of mapped pixel values corresponding to the laser line position data;

FIG. 12E is a diagram of mapped pixel values including connection features;

FIG. 12F is a diagram of mapped pixel values including representative position values and representative indicia values;

FIG. 12G is a diagram of a portion of the calibrated height image and the uniformly scaled grayscale image;

DETAILED DESCRIPTION

I. System Overview

Figure 1:
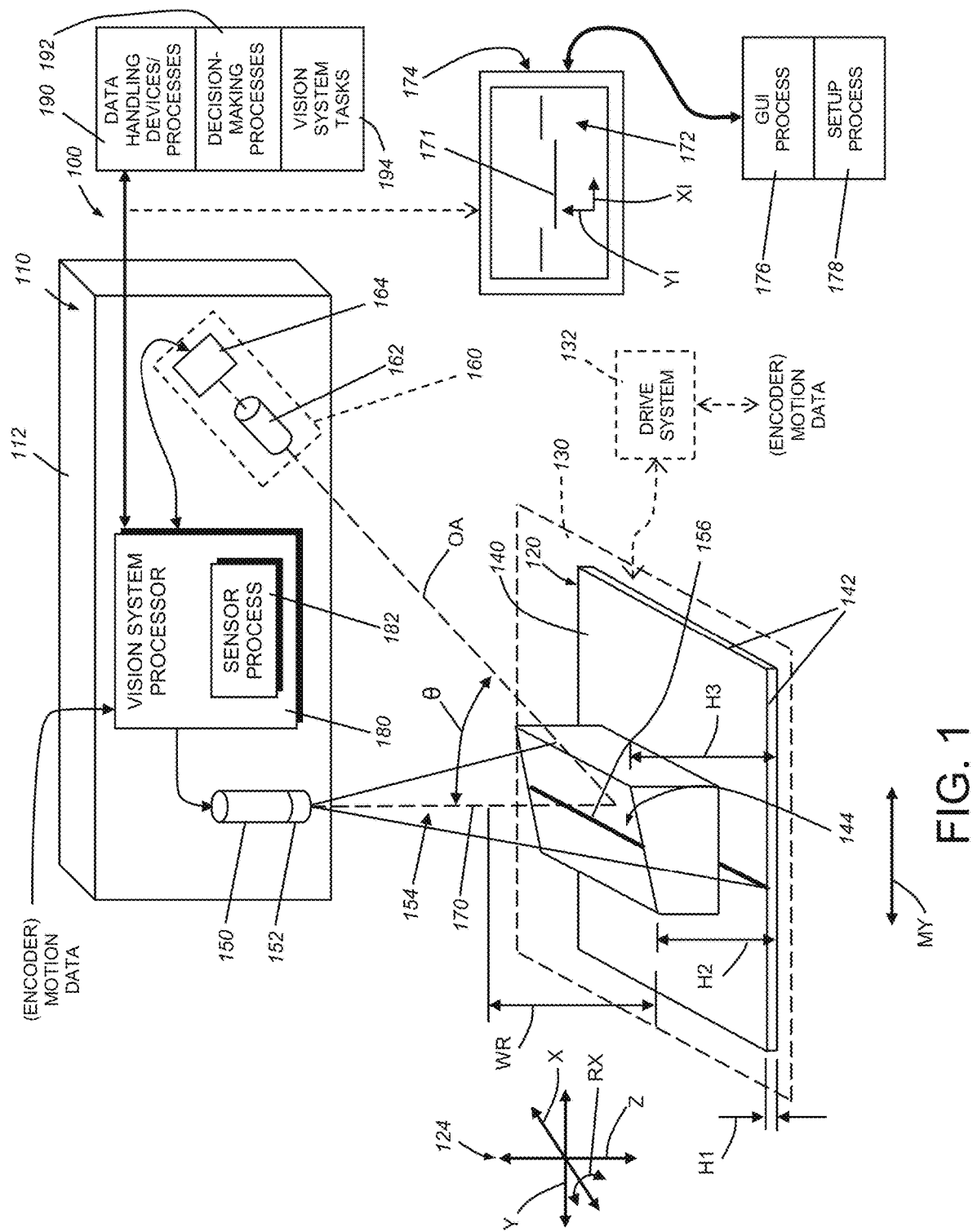
FIG. 1 is a schematic perspective view of a laser displacement sensor system acquiring an image of an object as relative motion occurs therebetween in a scanning direction according to an illustrative embodiment.

FIG. 1 shows a vision system arrangement 100 including a laser displacement sensor assembly 110 oriented to image an object 120 (also sometimes referred to as a "part"). The displacement sensor assembly (or, simply "displacement sensor") can be contained in a single housing 112 that is mounted at an appropriate location with respect to the imaged scene. In alternate embodiments, the displacement sensor can comprise discrete, separated subcomponents. The object 120 and the displacement sensor 110 are in relative motion (double arrow My) with either the displacement sensor 110, the object 120, or both, moving (the scan motion direction) along at least one axis. The motion direction is often aligned with the depicted, relative (e.g. global) coordinate system 124 (in this example, the physical y-axis direction). In a typical arrangement, the object 120 is located on a moving surface 130 (shown in phantom), such as a conveyor belt or motion stage, which provides motion data from an encoder or similar device operatively connected to the moving surface's drive system 132 in a manner clear to those of skill in the art. The object 120 is, by way of example, a structure having a surrounding surface 140 that is relatively planar, with a height H1, and extends to an outer perimeter 142. Located internal of the exemplary outer perimeter 142 is a surface 144 that varies in displacement along the physical z-axis direction between a height H2 and a height H3. Note that each height, H1, H2 and H3 can be expressed in physical dimensions, such as millimeters, from a base plane that can be the plane of the moving surface 130, or another reference plane). Note again that this depicted object 120 is only one example of a wide range of possible surface shapes, and is described as a useful example of the principles of the illustrative embodiment of the system and method. In further examples the outer, surrounding surface can define a more complex perimeter with additional features, such as fastener holes and the inner structure can be a more variable shape. Likewise, an outer, surrounding surface can be omitted form an exemplary object, in whole or in part.

The displacement sensor assembly 110 includes a laser assembly 150 that includes a lens or other optical arrangement 152 (e.g. a Powell lens or a cylindrical lens) that projects a curtain or fan 154 of laser light, toward the object 120 in a manner that forms a line 156 along the physical x-axis (largely transverse to the scan motion direction My). The fan 154 resides generally in a plane that, in this embodiment, is approximately (or substantially) perpendicular to a reference plane, such as the physical x-y plane of the moving surface 130 and/or a plane of the surrounding object surface 140. The displacement sensor 110 also includes a camera assembly (dashed box 160) consisting generally of a lens/optics assembly illustratively arranged in a well-known Scheimpflug configuration 162 and an imager assembly ("imager") 164. The imager 164 contains an array of photosensitive pixels at a predetermined resolution, and the camera assembly generally defines an optical axis OA that falls within the field of view where the line 156 is visible upon the object at various surface heights. The optical axis OA defines a non-parallel (e.g. acute) angle ⊖ with respect to the plane (and associated line 170) of the laser fan 154. Thus, any physical z-axis height variation/displacement in the line along the physical x-axis is imaged by the camera assembly 160 as a variation in position (along the image axis YI) in the resulting line 171 of a displayed two-dimensional (2D) image 172 as shown generally in the exemplary (and optional) display 174 that can be part of a computing device (e.g. a handheld, laptop, tablet or PC). As described further below, the computing device can interact with hardware and/or software that includes a graphical user interface process 176 and device setup process, each of which allow the user to interact with the vision system processor 180 to set up, monitor and control the various functions and parameters of the displacement sensor 110.

Note that the depicted arrangement of axes (x, y, z) 124 is a convention and other representations of relative orientation (e.g. polar coordinates) are expressly contemplated. As shown, rotation about a given axis is also represented, for example by the double-curved arrow Rx, which depicts rotation about the physical x-axis.

The imager 164 is operatively interconnected to a vision system processor 180 that is contained within the housing 112 of the displacement sensor 110 in this embodiment. In alternate embodiments, some or all of the vision system processor components and/or processes can reside remote from the housing (on an interconnected PC, for example). The vision system processor 180 performs a displacement sensor process 182 in accordance with the illustrative embodiment described in detail further below. The processor 180 also receives relative motion signals from the moving surface 130 or another motion-inducing device (e.g. a gantry or manipulator holding the displacement sensor and/or the object). Acquired images are acquired in association with such motion signals so that the line 156 is imaged at specified object positioning's in the scene. As used herein, the term acquired images refers to a collection of pixel values on the imager. As also used herein and as will be described in greater detail below, the term height image (or range image) refers to the collection of height pixel values generated from one or more acquired images and the term grayscale image refers to the collection of grayscale pixel values generated from one or more acquired images.

As also described below, the image data (i.e. a 2D height image—also often termed a "range image") for the object is transmitted to downstream data handling devices and processes (190 in FIG. 1) for use in various production activities, such as quality control, object manipulation, assembly, etc. Users typically desire measurements characterized in physical units (e.g., millimeters or microns in x and y and z), rather than image units (i.e. pixels/pels in x, encoder motion-based triggers in y, and row displacements in z). For this reason, displacement sensors are typically calibrated to convert between image pixel outputs and physical units, such that the calibrated displacement sensor output is in physical units. Displacement sensor calibration can be performed by the manufacturer such that the displacement sensor provides output in physical units (such as the model DS1100 available from Cognex Corporation of Natick, Mass.). Alternatively, sensors can provide output in uncalibrated image units. When the sensor output is in uncalibrated image units, the user or application is tasked with handling input data in image pixel units. The user can also specify the desired height dimensions in terms of height image pixel scale (in physical units) and height image pixel-level scale (in terms of how many physical units each pixel-level represents) when the height image uses integral pixel values. In another example, the height image can be represented as a 2D array of floating point values.

Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software.

The sensor process 182 includes calibration values that are established at setup, which map the location of the line within the imager's field of view with a physical height (e.g. H1, H2, H3, etc.). The calibration process can employ a calibration object that is moved along the z-axis via a motion stage, or other conveyance to precise, known heights, and the relative y-position (i.e. Y1 in the 2D display) of the imaged line at that physical height is used to generate a curve or table of values that reference each y-position with a given physical height. Each y-position in each column (as noted below, there can exist multiple y-values per column) is mapped to a physical height, and the same y-position in different columns can map to a different physical height based upon calibration parameters, and the like. Alternatively, values can be generated using a parametric model of the relationship between pixel locations and the x, z positions in physical units. Illustratively, the sensor process 182 determines the position of the line (e.g. the center or other specified location(s), such as the start and end locations of the detected line thickness), and then uses this value in determining the physical height of that portion of the object surface. More particularly, and with reference to the diagram of FIG. 2, a portion of the imager 164 is shown. The imager consists of an M-row×N-column array of photosensitive elements commonly termed "pixels" 210. These pixels each generate a charge based upon incident light exposure. That charge is directed through an analog-to-digital converter arrangement (not-shown), where it is translated into a digital numerical value relative to the level of charge. This value is stored as image pixel data for use by the processor 180. In a non-limiting example, a pixel array of 768 rows×1024 columns can be employed. By way of further non-limiting example a field of view of approximately 175 millimeters is provided with a vertical working range (WR) varying (along 170 from the laser 150) of between approximately 140 millimeters (WRmin) and 315 millimeters (WRmax). These dimensions are only exemplary of a wide range of operating parameters and are provided by way of further illustration of the principles herein.

The depicted portion of the pixel array contains segments 220, 230 of the imaged laser line where the height transitions between the lower and higher surfaces 140 and 144, respectively. That is, the pixels in the array which are exposed to the light of the line are shown within the dashed lines of the segments 220, 230. Note that several rows fall within each line segment. The vision sensor process 182 typically computes a line center in each column. This line center can be resolved to a sub-pixel level based upon a variety of factors and computations known to those in the art. For example, resolution of 1/16 of a pixel can be obtained using appropriate algorithms and the data from one or more scans.

Figure 3:
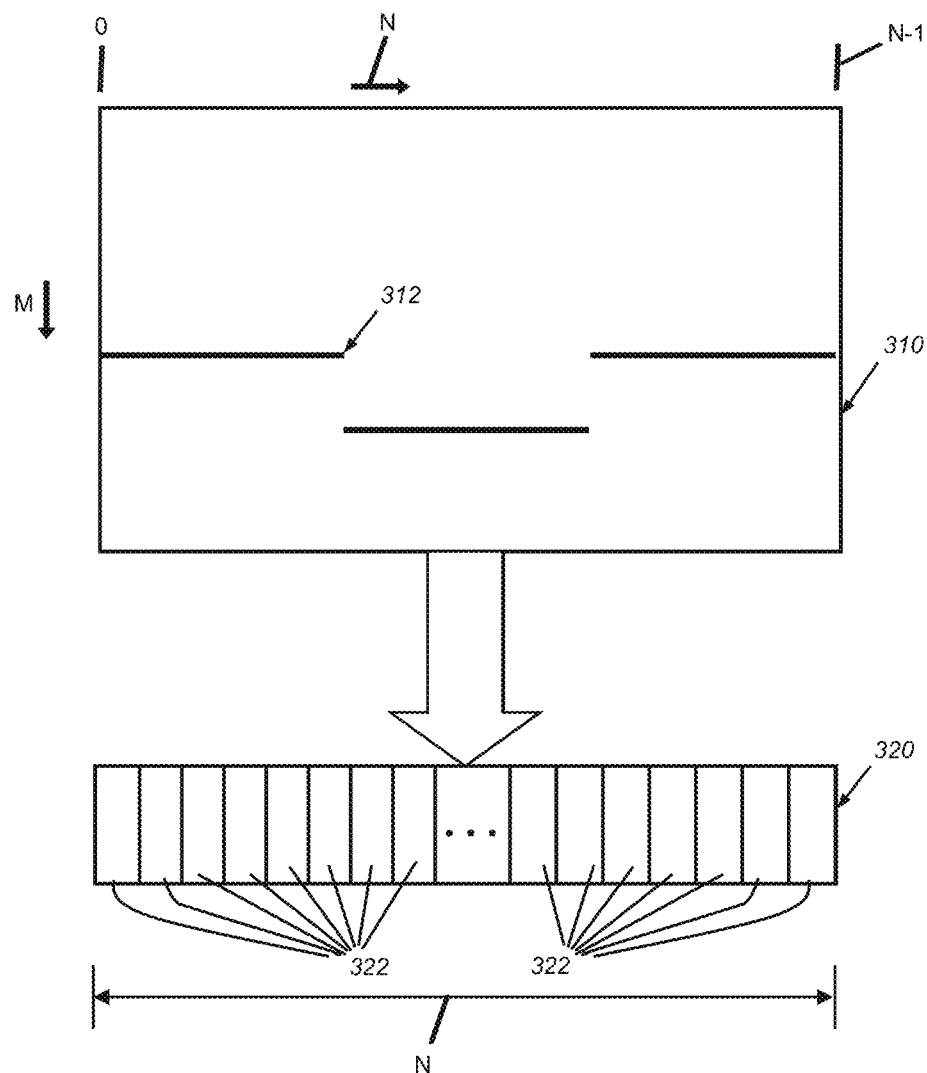
FIG. 3 is a schematic diagram of the imager of FIG. 1 showing the generation of a height image from an acquired image of a laser line within the displacement sensor's field of view.

Each scan produces one line of a height or range image. As shown in FIG. 3, the acquired image 310 of the field of view containing a laser line 312 is processed to generate a N-wide field 320 of values 322 contain a physical height (z-height, e.g. in millimeters) for each pixel column (0 . . . N−1) of the acquired image. While in some embodiments, the physical height for each value 322 can be generated at this time, the present embodiment defers generation of physical height until a further downstream process step. In the present embodiment, the location of the laser line in subpixel resolution is generated in pixel units, and at a subsequent step, calibration parameters are applied to the pixel units to generate a set of x, z values (i.e. the scan line in physical units). Note that there may be more or less (x, z) pairs in the physical unit scan line than there are in the line location (in pixels) vector generated by the imager, because the scan line in physical units can be remapped to include finer/coarser sampling, as desired. Also, the number of values (322) per column can vary along the X-direction so that more than one value per column is generated. For example the start and end positions of the laser line in the x-direction can be provided, as well as the center and other metrics, such as the standard deviation. In general, the field 320 represents a height image consisting of height values for each x-coordinate (column) across the scanned object surface. As the object is scanned, a series of successive fields can be combined (with knowledge of the y-direction motion between scans based on the encoder) to derive an overall profile of the object surface.

In generating each height image (320), the process reduces noise and improves the accuracy in locating the line center position (and thus height value) by applying a filtering algorithm to a neighborhood of rows. A variety of conventional and/or novel filters can be employed. In an illustrative embodiment, a line finding algorithm runs on the result of applying a symmetrical 1-2-4-2-1 vertical filter kernel to the acquired image about each line for which a measurement is made, i.e. for every row in the acquired image pixel values in current row are multiplied by 1, the pixel values from the previous row multiplied by 2, the row before is multiplied by 4, the row before that is multiplied by 2, and the row before that by 1. The filter output is the sum of the five products listed above. Choice of the 1-2-4-2-1 filter is odd-sized so that the center application point of the filter can correspond to the same location as the result of the application of the filter. Other filters may be used based on user preference, project parameters, or other circumstances. For example, such other filters may include different widths and/or different coefficients, such as 1-2-4-6-4-2-1 or 1-3-3-1, etc. The filter values in rows above, at, and below the maximum filter response location are used to determine line location with sub-pixel accuracy using quadratic interpolation (or other known techniques). If there is a plateau in filter response, then the center of the plateau is used instead of the peak position.

Special consideration should be given to the rows close to the beginning and the end of the region in the image. For the first and last lines, the system does not generate a filter measurement. For the second and second-to-last lines, the system approximates the desired 1-2-4-2-1 kernel with a 3-4-2-1 or 1-2-4-3 kernel, respectively. In an illustrative embodiment, the line finding process can, more particularly, employ the following filters relative to various locations in the region of interest (also described further below) of the image:

| Row number (in the analyzed region) | Filter used |
|---|---|
| 0 | No filter measurement made |
| 1 | 3-4-2-1 |
| 2, 3, . . . | 1-2-4-2-1 |
| $2^{nd}$ last row | 1-2-4-3 |
| Last row | No filter measurement made |

Again, note that the filter response for a given row cannot actually be computed until the two following rows have been acquired—except just a single following row is used when computing the response for the second-to-last row in a region. In addition, when the user indicates the height measurement should encompass the range Hmin-Hmax in physical units, we need to convert that to a range of rows Rmin to Rmax and then add at least one row each at top and bottom such that we can have filter outputs that correspond to measurements in the full Hmin to Hmax range.

II. Split Regions of Interest

Figure 2:
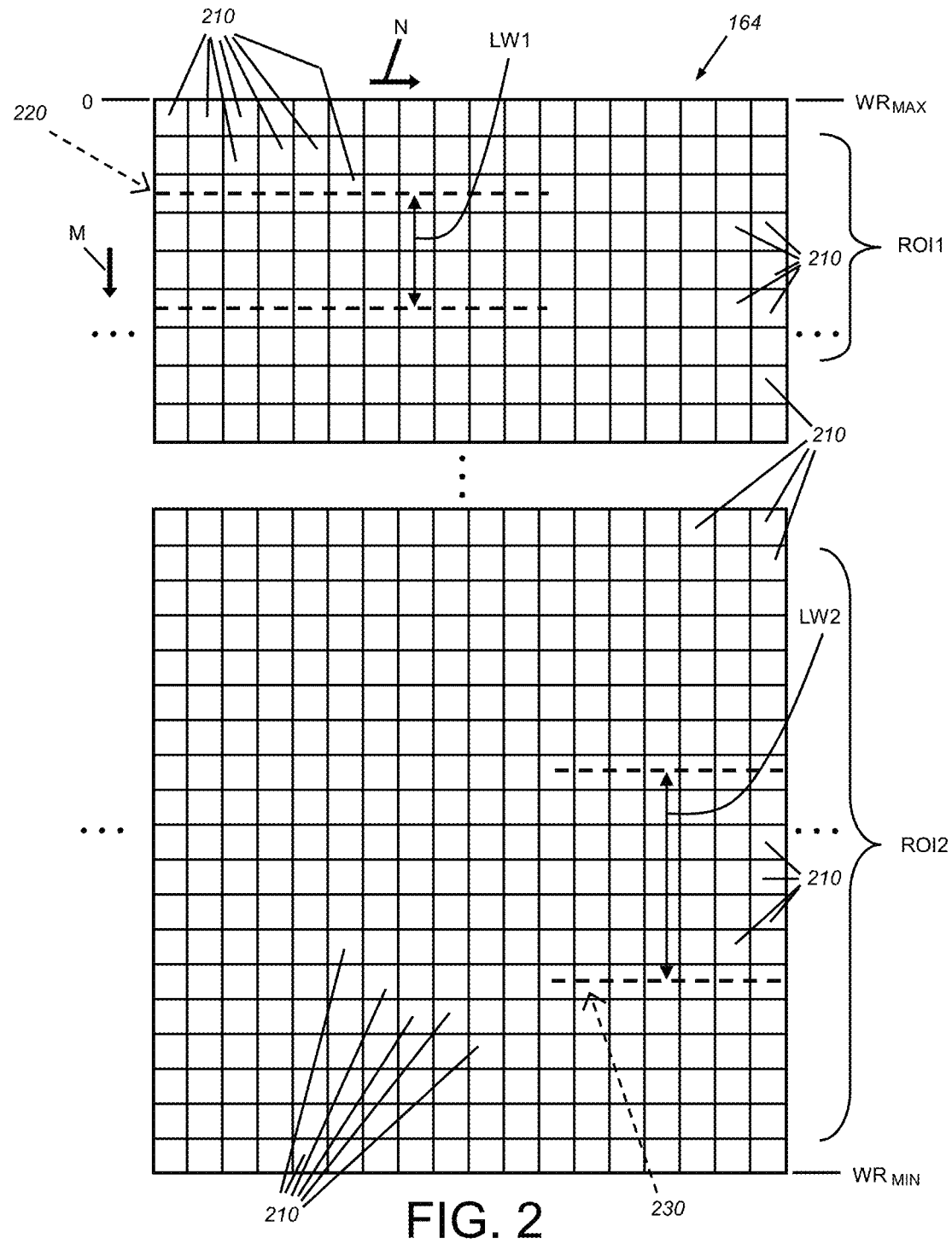
FIG. 2 is a schematic diagram of a portion of an imager pixel array including regions containing portions of an exemplary, imaged laser line according to the embodiment of FIG. 1.
Figure 4:
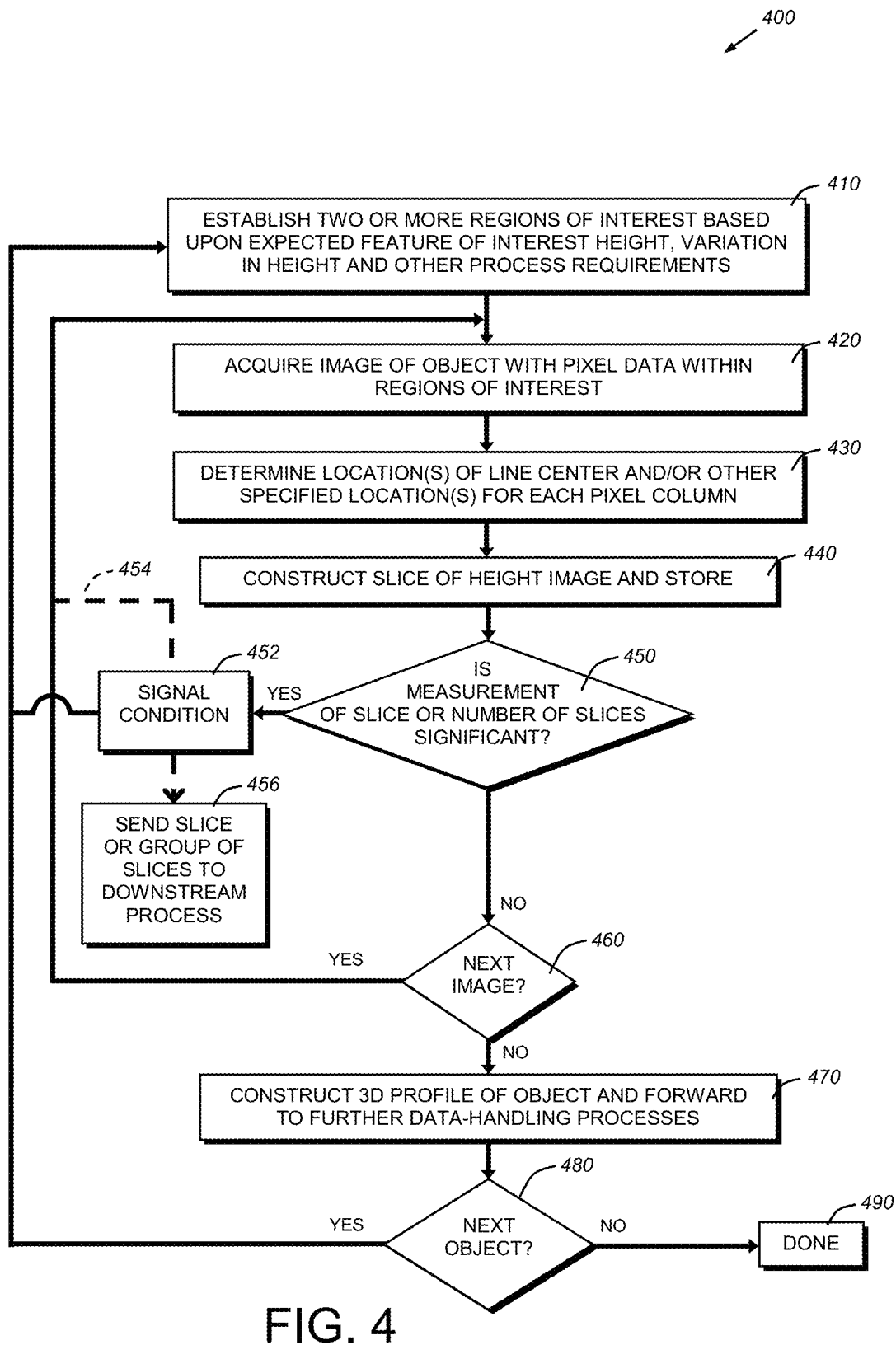
FIG. 4 is a flow diagram of a procedure for processing height image data within regions of interest of the overall acquired image according to an illustrative embodiment.

With reference to FIG. 2, it is contemplated that various surface profiles can contain features of interest that are separated by a significant distance within the working range, and features outside of the regions containing features of interest are lacking or unimportant to the analysis of the object. In the example of the object 120, the base surface 140 and raised surface 144 are of interest and no significant features exist in the height range between these surfaces. Thus, a region of interest exists around height H1 and between heights H2 and H3. All other heights are unneeded for the analysis. However, significant processing time and resources can be spent in analyzing the entire field of view for line information. In many applications, the general location of a feature of interest within the field of view can be predictably determined, within a relatively small height range. According to an illustrative embodiment, and with further reference to the procedure 400 of FIG. 4, the sensor process defines a plurality of regions of interest ROI1 and ROI2 (FIG. 2) in the field of view. Each region includes a plurality of rows in the imager. Each region of interest is sufficiently tall in the column dimension of the imager to accommodate the expected location of a laser line based upon the height of the object features and variations in height due to motion of the object relative to the field of view, or due to other process requirements. In an embodiment, each region of interest row includes pixels from all contiguous columns. According to the procedure 400, the user, based upon an estimate of the physical height of object features of interest, their variation in height, as those features move through the scan and variations in the process, establishes regions of interest that the process coordinates with pixel locations in the imager (step 410). At the appropriate encoder (or other motion-based) value, the imager acquires an acquired image of the object (step 420). The process of setting regions of interest causes the imager, or another downstream component to acquire image pixel data exclusively (only) within the pixel rows residing within the set regions of interest. As such, the processor can focus resources on image data only from each region of interest, thereby reducing image readout time (as image pixels outside the regions of interest are not transmitted) and speeding the computation of surface height in each image. Note that the region of interest for the line segment 230 is sufficiently large to accommodate the variation in surface height of the surface 144 as the object moves through the scan along the y-axis as well as other process requirements.

In an embodiment, the imager includes a capability to, via the processor 180, switch on or switch off the output of selected rows. In alternate embodiments, the imager can set ranges of rows to switch on (allowing readout of selected rows) or off (preventing readout of deselected rows). Other arrangements that block the processing of predetermined rows of image data can be implemented in further embodiments.

In step 430, the procedure 400 employs the above-described line finding algorithm to locate the position of the line with sub-pixel accuracy. Laser line intensity data and laser line position data can also be computed by peak detection. For each column, the peak value/position of the filter response, e.g., the acquired pixel values subjected to the filtering process above, is found. The laser line position data, which comprises one or more laser line position datum, corresponds to the position of the filter peak value (in each column). The laser line intensity data, which comprises one or more laser line intensity datum, corresponds to that filter peak value. The term datum is used to refer to a measured value, such as a pixel value; the line intensity datum refers to the laser line intensity pixel value, and the line position datum refers to the laser line position. The term data is sometimes used to refer to a set of individual datum, and sometimes used to refer to an individual datum. The position of the line in each column is used in step 440 to construct a slice of an overall height image representing the profile of that slice of the object. In optional decision step 450, the measurements of a slice can be analyzed to determine if a condition—such as an out-of-specification object is present. If so, the system signals the condition (e.g. a failure) in step 452 and takes other appropriate action (e.g. ejecting the failed object, sounding an alarm, stopping the line, etc.), and can loop to inspect the next object in step 410. However, it is expressly contemplated that various applications can continue to scan an object even after an erroneous condition is identified (via dashed branch 454, which returns to scan acquisition step 420). Note also that the step 450 can also be used to count single or multiple scans (slices) of the image. This/these slice(s) can represent a region of interest, or combination of regions of interest, in the field of view. That is, while some system processes employ a scan the entire object surface (for example, to ensure that alignment, measurements, and decision-making are based on the full 3D representation of the object), some system processes can desirably employ individual scans (slices) of the object surface (i.e. part cross-sections), and e.g. align, measure, yield data and/or make decisions based upon each individual scan/slice. Thus the slice is transmitted to one or more downstream processes via step 456. Additionally, some system processes use groups of scans (e.g. ten cross-sections at a time), and combine this data using an appropriate technique (such as smoothing, averaging, other image processing operations, etc.). This combined data is then used to align, measure, yield data and/or make decisions. Scanning can continue as this group is processed via branch 454 as slices are sent to the downstream system process(es) in step 456. Moreover, some system processes employ a combination of above to provide fast measurements/decisions, etc. based on individual/groups of scans, and final measurements, etc. based on the entire (or a larger portion of the) scanned object.

Absent a signaled condition (fault, single slice, multiple slices) in step 450, the scan can continue (via decision step 460) until images of the line located over the entire object surface (or a desired portion of the surface) have been acquired. The individual height images are then used to construct a 3D profile of the object surface for use by downstream data handling processes (190 in FIG. 1), such as quality control, defect detection, part ejection, etc. Notably, downstream measurements or similar information that encompass physical data generated by the analysis of more than one region of interest can be used in one or more decision-making process(es) (192 in FIG. 1) and/or vision system task(s) (194 in FIG. 1). It is also contemplated that the downstream measurements or similar information can employ physical data between more than one ROI generated by the same scan. More particularly, various image processing operations undertaken on the regions of interest can be applied across (and applying data from) multiple regions of interest in the overall height image to derive particular information about the object. Such processes can include, but are not limited to pattern-matching operations, inspection operations, pick-and-place (and other robot manipulator) operations, tolerancing operations, and/or any other vision system function that can employ image data derived from a height image. The process continues (via decision step 480 for each object until done (step 490).

Figure 5:
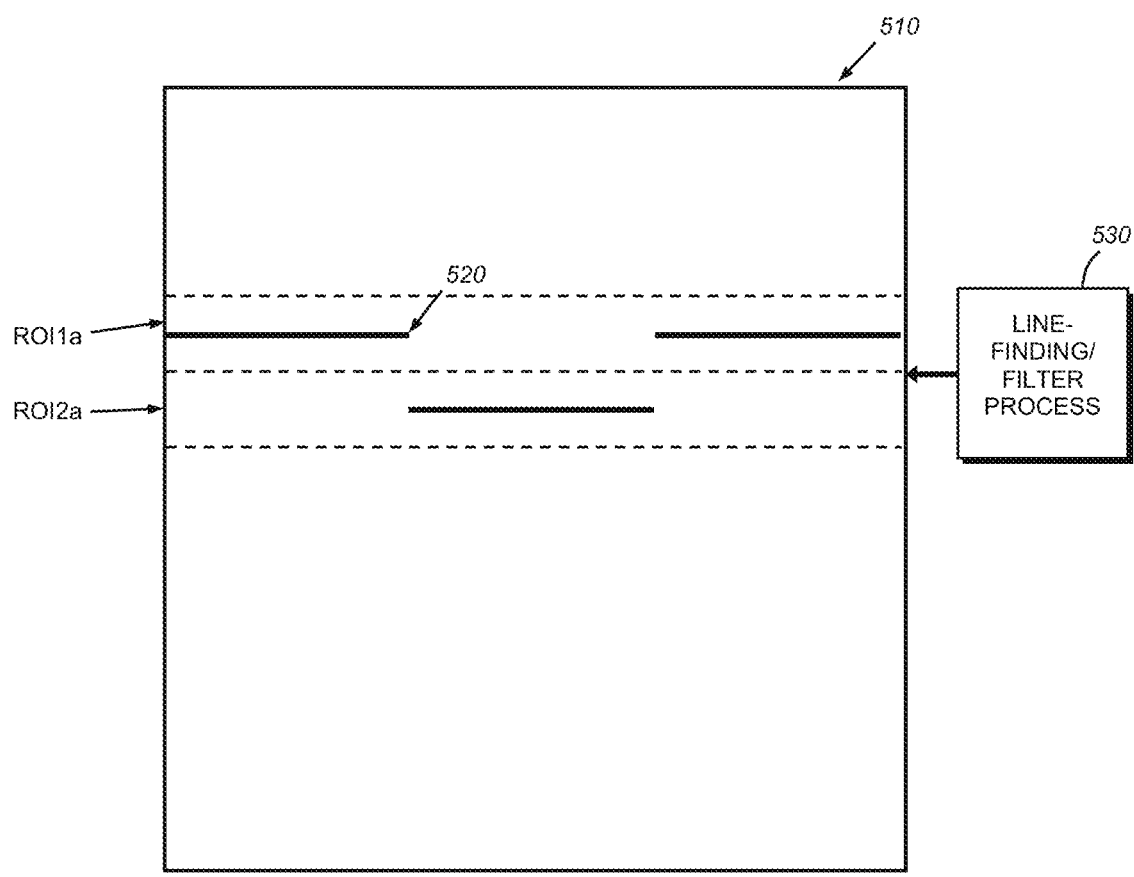
FIG. 5 is a diagram of an image of a laser line in which two regions of interest are adjacent to each other, free of a gap therebetween.

With reference to FIG. 5, in certain implementations the features of interest can be located in closer height proximity such that the field of view 510 contains a line that is analyzed using two adjacent or closer proximity (and non-overlapping) regions of interest ROI1*a* and ROI2*a*. In this illustrative arrangement, the above-described line-finding and filter process (530) is modified to accommodate the lack of gap between the regions. In this special case, the beginning portion of the above-described table is modified to accommodate the second region. Note that regions can generally be arranged in a manner that the first row in the second region is the next to the last row in the first image, i.e. there is no gap between them. Thus, the filters can be applied to each adjacent region (ROI1*a* and ROI2*a*, respectively) applied in the following manner:

First Region:

| Row number | Filter used |
| --- | --- |
| 0 | No filter measurement made |
| 1 | 3-4-2-1 |
| 2, 3, up to $2^{nd}$ to last row | 1-2-4-2-1 |
| Last row | No filter measurement |

Since the sensor acquires only every other row in the second region the narrower filter used in the first region cannot be run in the second region. However the wider filter that is used throughout the second region can also be applied in the last few rows of the first region. The wider filter results in this region overlap the results from the narrow filter and can be used to "blend" data between the regions.

First Region Overlap Area:

| Row number | Filter used |
| --- | --- |
| Last - 3 row | 1-2-4-2-1 |
| Last - 1 row | 1-2-4-2-1 |

Second Region:

| Row number | Filter used |
| --- | --- |
| 0, 1, onward | 1-2-4-2-1 |
| Last - 1 row | 1-2-4-3 |
| Last row | No filter measurement |

Figure 6:
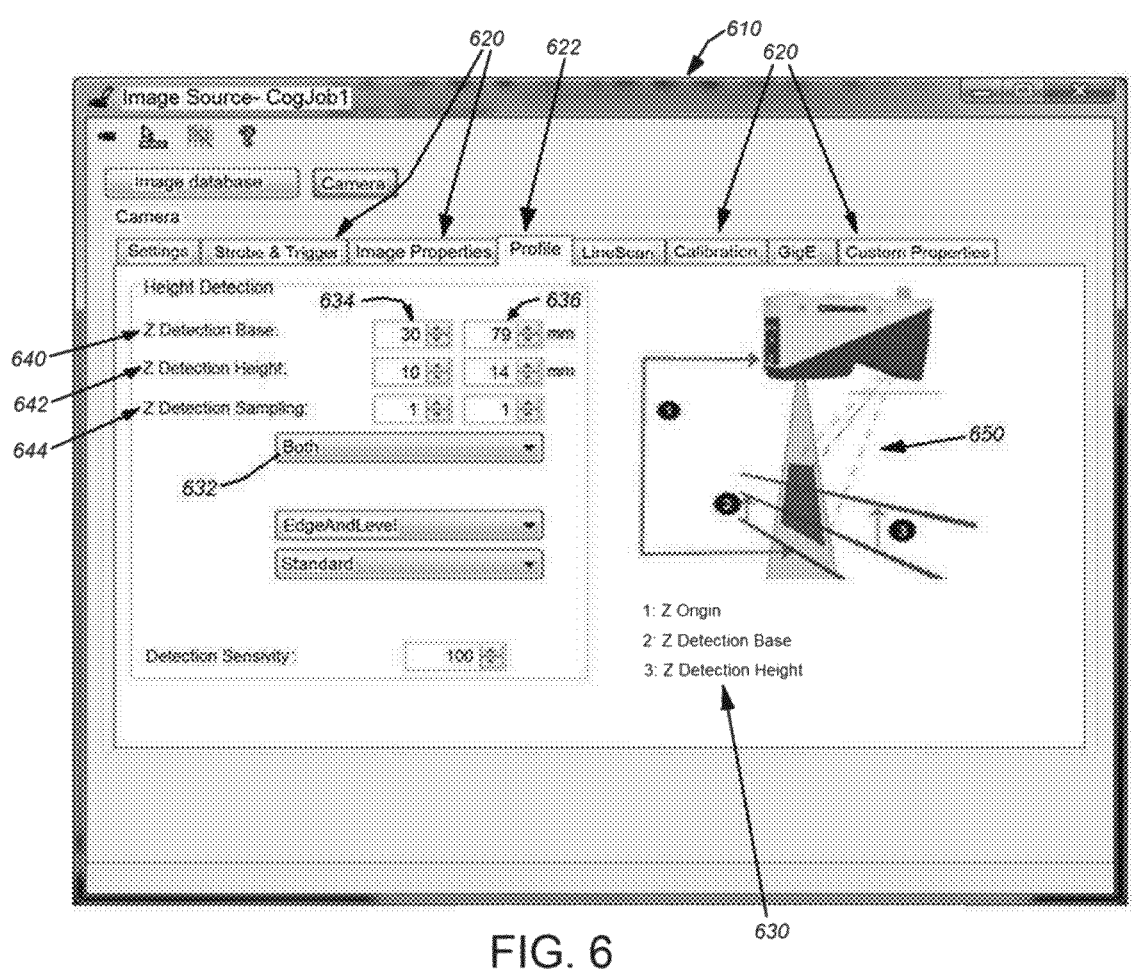
FIG. 6 is a screen display of a Graphical User Interface (GUI) for use with the displacement sensor system of FIG. 1, in which regions of interest for detection on the overall image of scanned object can be set in terms of physical units.

Notably, a GUI process (176 in FIG. 1) that is instantiated in the processor 180, the attached computing device, or both, enables the user to select regions of interest (typically) during setup. FIG. 6 shows a GUI display 610 of the setup interface for the interconnected displacement sensor 110. The display 610 includes a plurality of tabs 620 that access respective screens with which to train the sensor and set various parameters. The selected tab 622 displays the "profile" screen 630 that includes input boxes with which the user can select "Both" (632) to define multiple (two in this embodiment) sensed regions of interest in the overall detection base. The "Both" selection illustratively provides two columns 634 and 636, associated with each respective region of interest to be established in the field of view. Each region contains a setting for the physical location (in millimeters) of the Z Detection Base 640 (the start of the detection region from the z-origin of the working range), the Z Detection Height 642 (the z-distance of the respective region of interest) and a Z detection sampling value. In this example, the first region Z Detection base begins at 30 millimeters above the origin and extends for a height of 10 millimeters. The second region's Z Detection Base begins at 79 millimeters and extends for 14 millimeters thereabove. Both regions are sampled at a value of 1. Any areas in the field of view outside these regions are excluded from processing. Note that in embodiments in which more than two regions of interest are to be established, the "Both" selection can be substituted with a different dialog box, that establishes the number of regions and associated columns can be employed. To assist the user's understanding, these relationships (for each region of interest) are selectively depicted in a graphic 650 shown at the side of the input area of the display 630. This interface can allow generation of multiple regions of interest.

Figure 7:
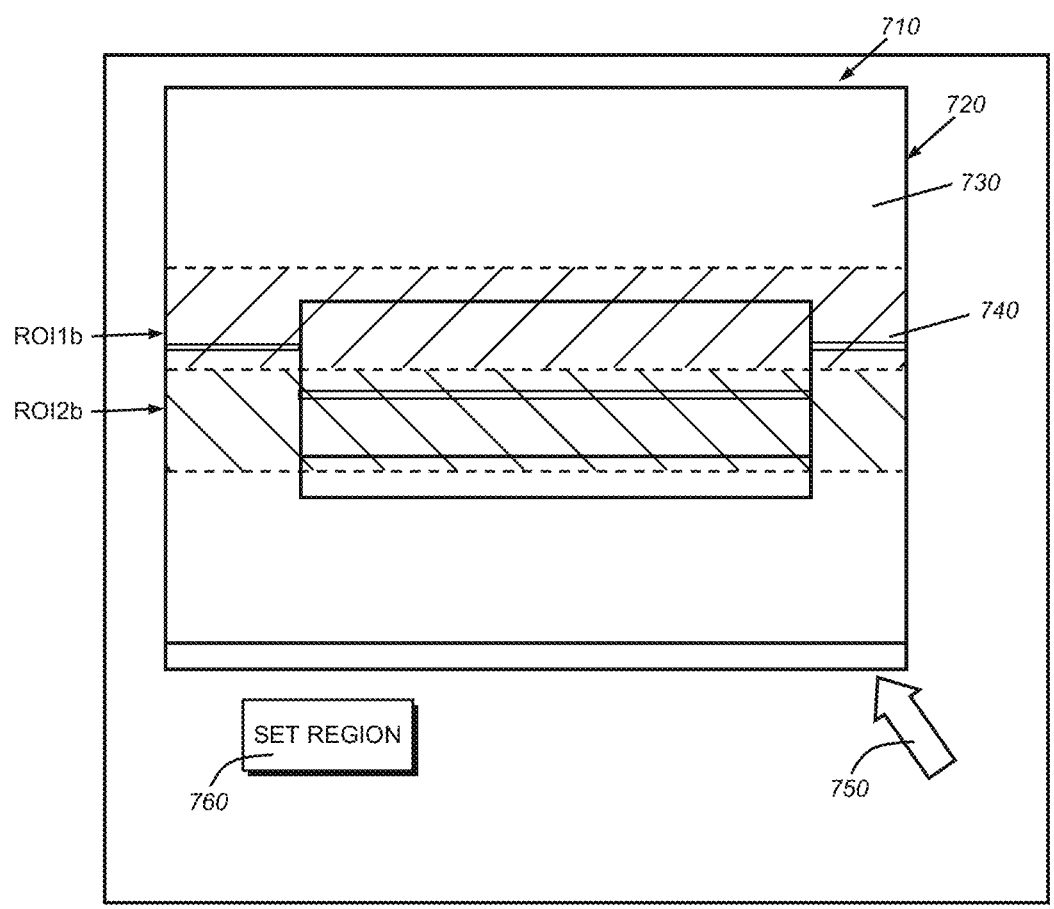
FIG. 7 is a diagram of a screen display including a GUI in which the user manipulates regions of interest and exclusion on an image of the object acquired by the displacement sensor.

FIG. 7 depicts an alternate implementation of a GUI for setting up detection and exclusion regions. In this embodiment, the display 710 includes a displayed image 720 of the entire field of view of the object 730. A laser line 740 is shown projected over the object 730. The user can move the object (via the conveyor, motion stage, etc.) to determine the limits of movement of the line in each region and the boundaries of associated regions of interest ROI1*b* and ROI2*b* are selected by the user. One or more appropriate buttons 760 can be employed to set regions of interest, in association with cursor (750) movements or similar interface functions known to those of skill. Having graphically set the regions of interest, the setup process translates these locations into physical measurements and locations along pixel columns in the imager.

III. Resolution Adjustment

Note, in further embodiments, as described below. Some or all of the rows can be defined at a reduced resolution—for example sampling every other row. In addition, and as shown in the example of FIG. 2, the more distant line segment 220 appears at a lower resolution, defining a width LW1, crossing fewer pixel rows than the closer line segment 230 which defines a width LW2, crossing more pixel rows that the line segment 220. Thus, the closer line segment is subjected to a denser scan and higher resolution than the further line segment. In general, the closer the distance of the imaged light within the working range, the higher the resolution of the image. Typically, the resolution of the further line segment is generally sufficient. Illustratively, the resolution of regions of interest at a shorter working range can be reduced by selectively switching off the output and/or processing of rows. For example in the region of interest, ROI2, every alternating row, can be switched off. For further resolution reduction every third or fourth row can be switched on, while intervening rows are switched off. The resolution of a longer-working-range region (ROI1) can also define a reduced resolution as appropriate in accordance with this technique. Where the resolution of both regions is reduced, a greater reduction is typically applied to the region at a shorter working range to compensate for its initial high resolution. Note that the ability to vary resolution can also be used to address the existence of a narrowed "waist" at the central region of the imaged laser line, and widened ends on each side of the waist.

Figure 8:
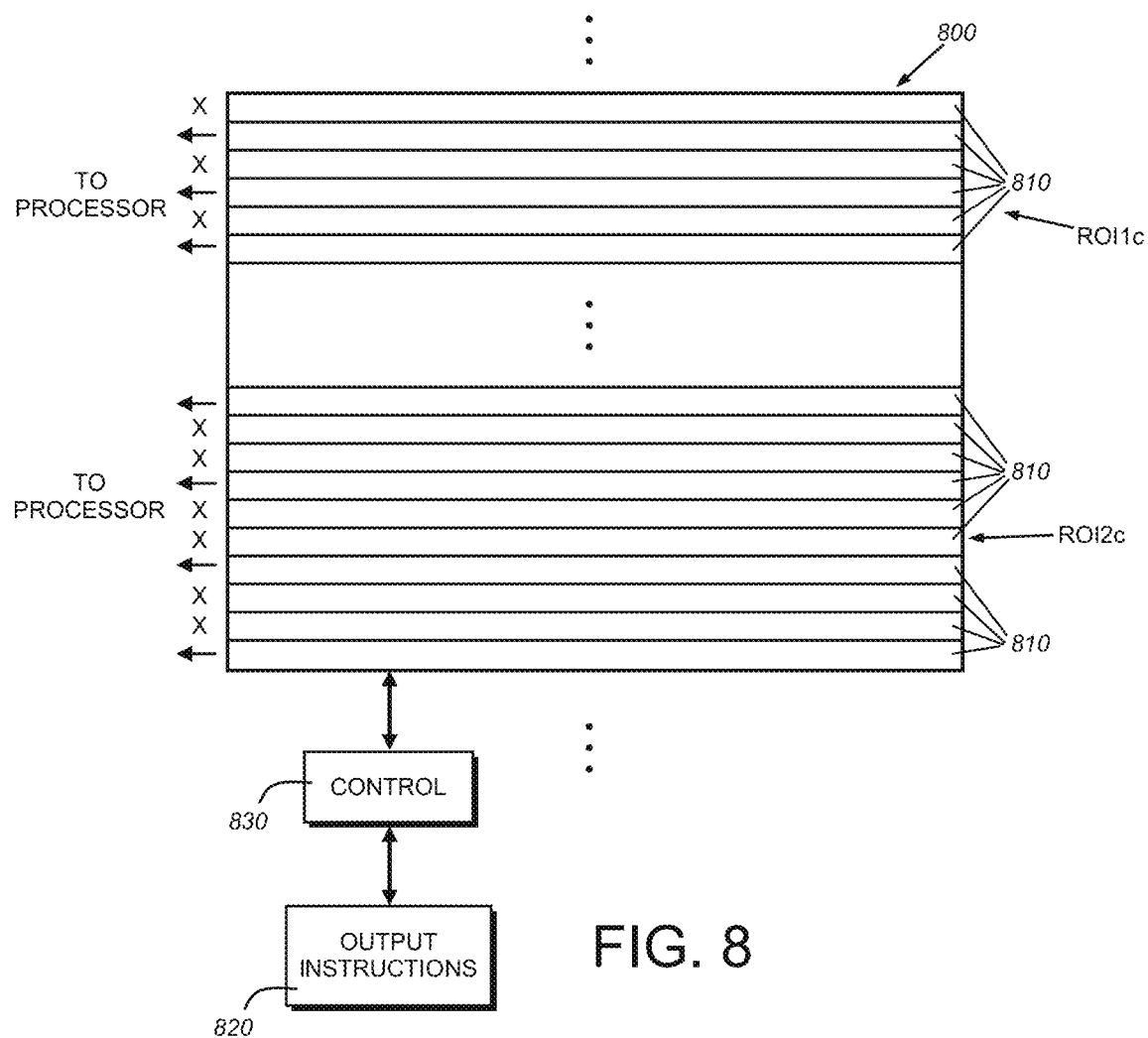
FIG. 8 is a diagram of portions of an imager at two regions of interest showing pixel rows that are selectively switched on or off to vary the resolution of the image at the region.
Figure 8A:
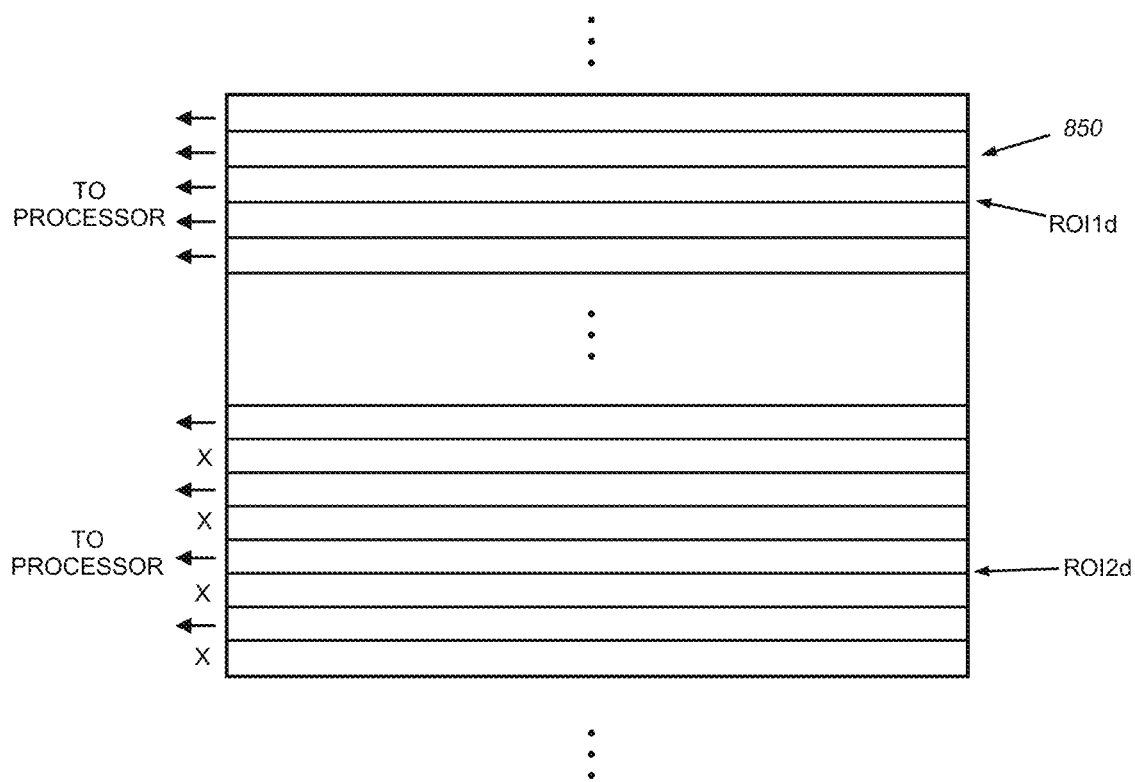
FIG. 8A is a diagram of portions of an imager at two regions of interest, in which the first region is at full resolution, with all pixel rows switched on, while the second row is at half resolution with every other pixel row switched.

By way of further illustration, FIG. 8 depicts an exemplary portion of an imager 800 including the pixel rows 810 associated with two regions of interest ROI1c and ROI2c. As shown, output instructions 810 are issued to the imager control circuitry 830 and/or to the vision system processor (based upon an automated arrangement or a GUI setting, for example) to discard signals (readout) from every alternating row (switched-off rows being designated by an "X") in the first region ROI1c. Likewise, in the second region ROI2c, every third row is switched on while the two intervening rows are switched off. In general, by reducing resolution, an acceptable profile is computed, while reducing processor workload and increasing the throughput speed of the scan. More particularly, the illustrative embodiment shown in FIG. 8A provides an imager 850 that transmits full resolution in the first region ROI1d (switched-on, readout of every row) and half resolution in the second region ROI2d (switched-on, readout of every other row). Control functions and instructions are similar to those described with reference to FIG. 8 above.

IV. Generation of Grayscale Images

In many manufacturing applications, among other processes, it is desirable to inspect both the height profile of an object, as well as certain 2D elements, such as printing. For example, the keys of a keyboard should all reside at a predetermined height and also each present the proper printed indicia (alphanumeric characters, symbols, etc.).

Figure 9:
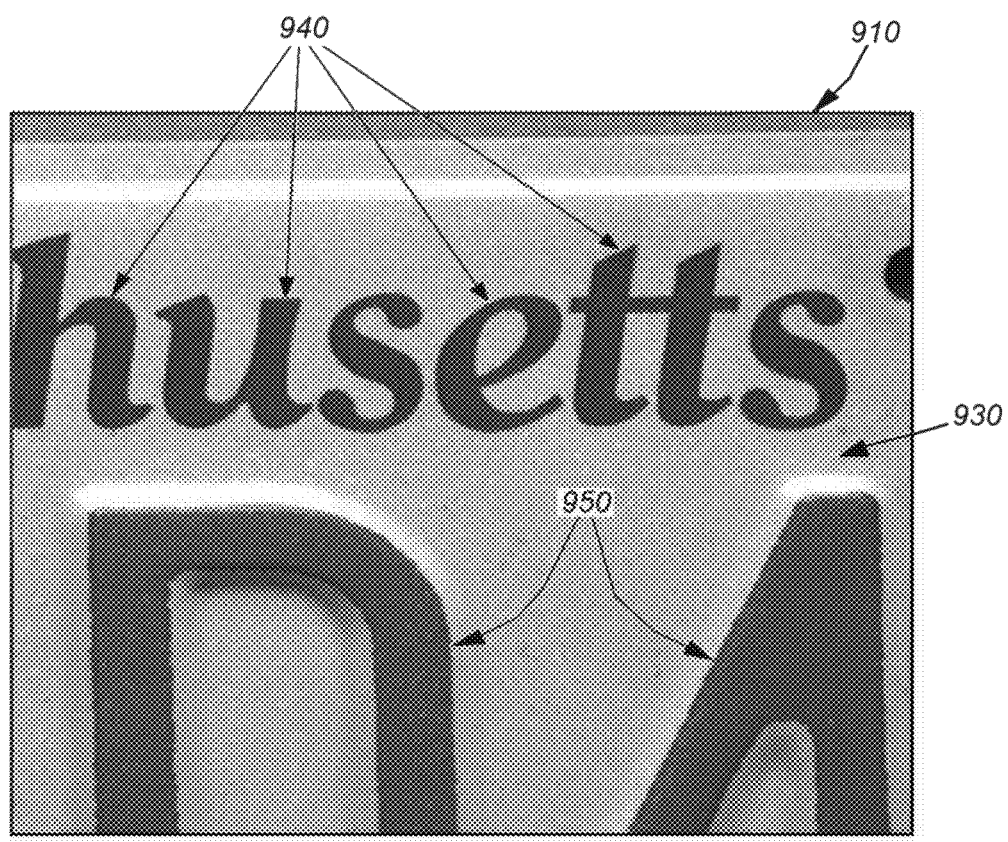
FIG. 9 is a diagram of an image of an exemplary object containing both height-varying features and variations in contrast from which a concurrent height image and grayscale image can be acquired using the displacement sensor system of FIG. 1.

By way of example, FIG. 9 is an image 910 of a common object (a license plate) 920, which contains both flat (relative to the surrounding plate base 930) printed elements 940 and raised elements. While each set of elements can be provided in a contrasting color (e.g. blue and red), it is contemplated that the laser color can be selected to appropriately resolve both colors in an acquired image. Based upon the acquired image data, the system can measure the maximum filter response of the acquired image intensities after each column is subjected to the filtering processes described above, such as a 1-2-4-2-1 filter, to create a grayscale image that is as insensitive as possible to height changes and shows contrast changes on the surface, such as printing. Alternatively, the system can use the same quadratic or other interpolation function to create an estimate of the response at the measured line subpixel position, and use that to create the grayscale image. Thus, the system can generate either a height image, a grayscale image, or both simultaneously (interleaved images). In some examples, the grayscale image can be generated from filtered laser line intensity data and the filtered laser line intensity images may be greater than an 8-bit value. This is because the 1-2-4-2-1 filter applied to an 8 bit value can yield a result greater than 8 bits. Since some machine vision routines expect an 8 bit grayscale image input, the system 100 can map laser line intensity 16-bit values to 8-bit grayscale image values. The user can employ a pixel map to map from the filtered laser line intensity image, which can have a bit value greater than 8-bits, to an 8-bit grayscale image. The grayscale image data can be post-processed according to the corresponding height information because laser lines may be thinner as laser return may be thinner and laser return may be dimmer the further the laser lines are positioned from the sensor. The bit-mapping described above can be application specification and/or part specific.

Figure 10:
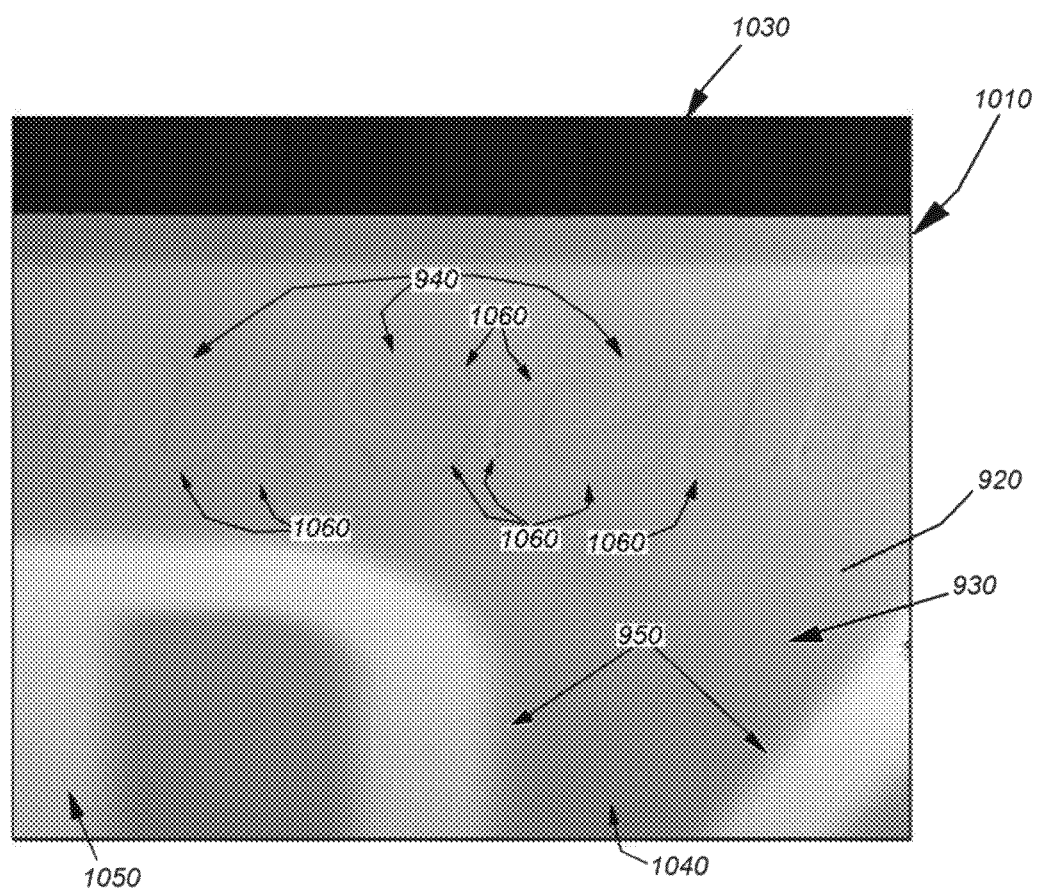
FIG. 10 is a diagram of a height image of the exemplary object of FIG. 9 depicting variation in height of certain features as an intensity reading and also showing contrast-based false height readings.

FIG. 10 details an associated height image 1010 of the object 920. Note that the height image 1010 is represented (for the purposes of illustration) with varying intensity based upon height, with black 1030 representing the height of the baseline of the working range, gray 1040 representing the elevated height (from baseline) of the plate base 930 and white 1050 representing the height of the raised elements 950. The flat printed elements 940 are also generally grey, matching the height of the base plate 930, but, as described below, include "false" edges 1060 that appear as slight height changes.

Figure 11:
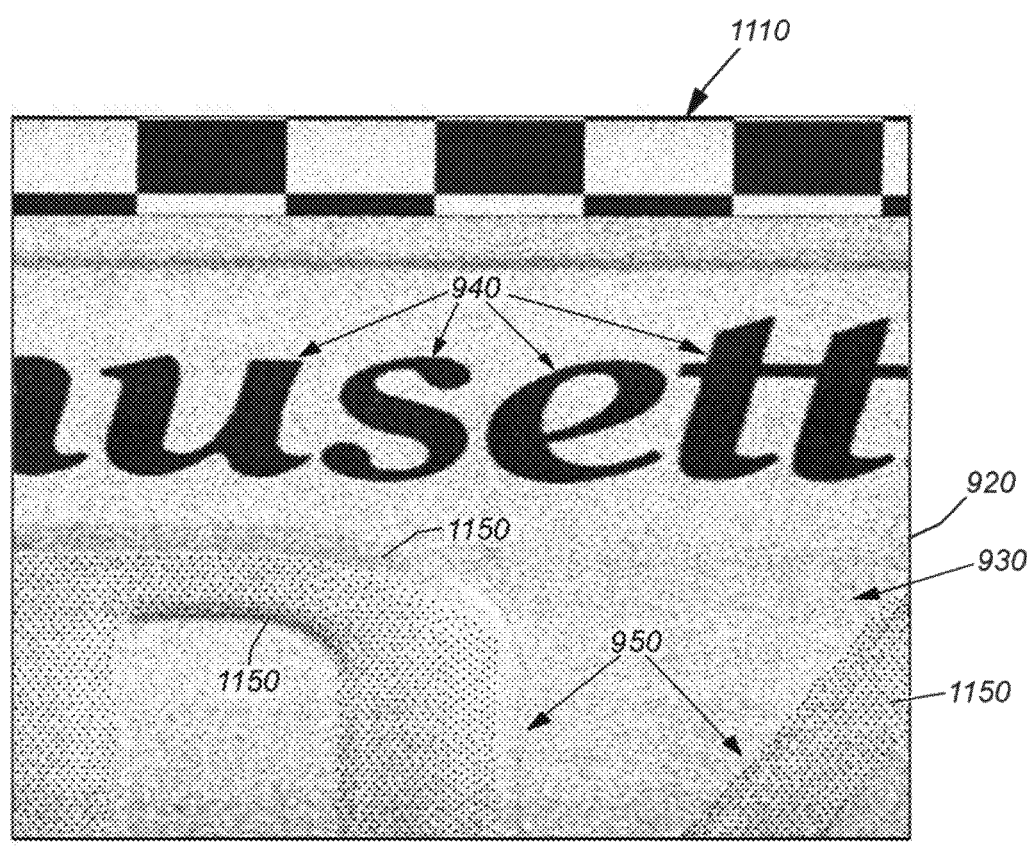
FIG. 11 is a diagram of a grayscale image of the exemplary object of FIG. 9 showing variation in contrast of certain features as a variation in grayscale intensity and depicting shadowing from certain raised features at height transitions thereof.

FIG. 11 represents a grayscale image 1110 of the object 920 acquired using the image data derived from the scan of the object under illumination of the laser line. As shown, the contrasting colors of the flat elements 940 are imaged clearly relative to the contrasting background of the plate base 930. The raised elements 950 are also imaged (although the color may be washed-out if a similar color laser is used—selection of an appropriate color and/or optical filter can ensure a complete grayscale image of the object is acquired). The raised elements may also contain subtle features 1150 due to shadowing from the angled perimeters of the raised elements. This effect can be significantly reduced by applying corrections based on grayscale image. For example, the vertical gradient can be calculated in each pixel of the grayscale image and correction based on this gradient can be applied to each height measurement in the height image.

Figure 12:
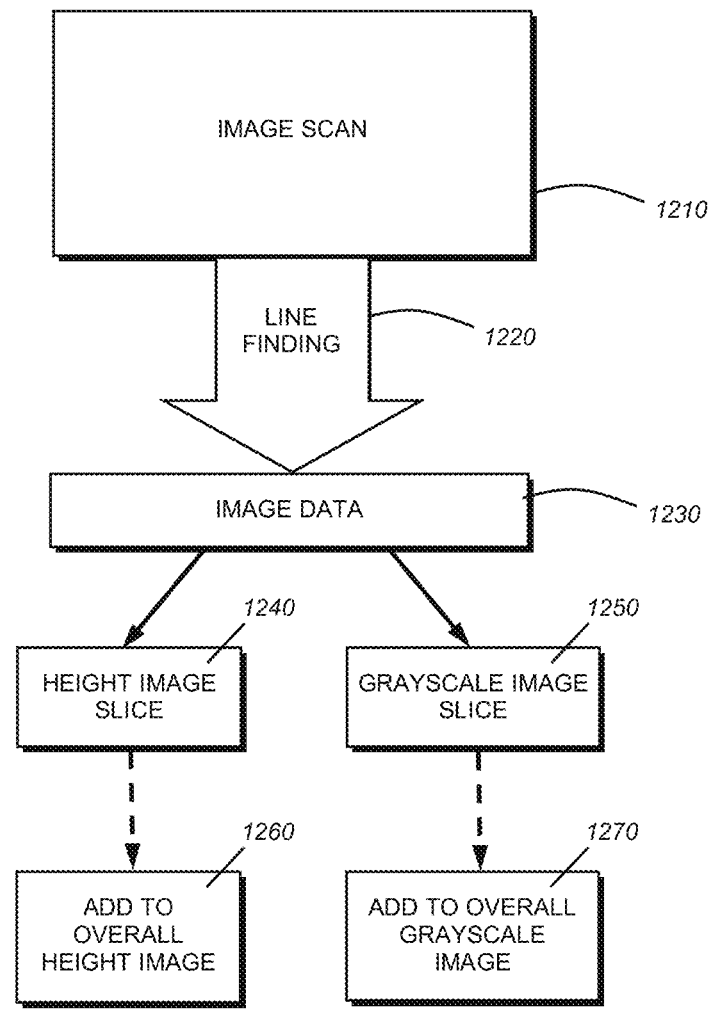
FIG. 12 is a flow diagram of a procedure for generating a height image and a grayscale image from image data acquired using a scanned image of the displacement sensor of FIG. 1.

As shown in the diagram of FIG. 12, the scan of the laser line generates an acquired image 1210. This acquired image is subjected to line-finding processes/algorithms 1220, as described generally above. These processes/algorithms 1220 can act upon a region of interest or the entire image as appropriate. The image data 1230, consisting of pixel grayscale intensity values in each column and the peak intensity location (and intensity value) are transferred by the line-finding process to be used in constructing a slice of a height image 1240, and also a slice of a grayscale image 1250. In another example, the image data 1230 can include grayscale intensity values that have been generated by subjecting the laser line intensity data to one or more filters described above. The height image uses the peak location in each column to generate a physical height value, while the intensity at peak is used as a grayscale value for that x-y location in the image.

As the image is scanned and a plurality of scans (1210) are acquired, the process generates further height and grayscale slices (1240, 1250) to add to overall height and/or grayscale images 1260, 1270 of the object. As described above, that the user can direct (via the GUI, for example) that either type of image, or both types of images, be generated. In an embodiment, one group of pixel rows can be used for generating height images and another group of pixel rows (e.g. alternating pixel rows, etc., as shown generally in FIG. 8) can be used to generate grayscale images. In this manner, the resolution of each image can be reduced by using fewer pixel rows, but discrete (differing) rows of pixels in the imager can be used concurrently to generate side-by-side height and grayscale images.

In some examples, the generated grayscale image data can include peak intensity datum values that are a result of a bad pixel location in the acquired images. As described above, the appearance of suspect or bad pixels in the grayscale image may be a manifestation of a defect or irregularity in the hardware or software used to generate the grayscale image. In particular, the use of imaging components with bad sensing elements can cause the appearance of such suspect or bad pixels. It can also cause incorrect results in the height images and in the grayscale images. It is therefore desirable to ignore the data corresponding to bad sensing elements by identifying suspect peak data values and using interpolated grayscale values from nearby data in place of the suspect peak data values. In another example, anomalous height values can signify that the associated grayscale information is suspect, e.g., suspect grayscale image values can be identified by analyzing the associated height information, either in the laser line information or in the height/grey level information.

Figure 12A:
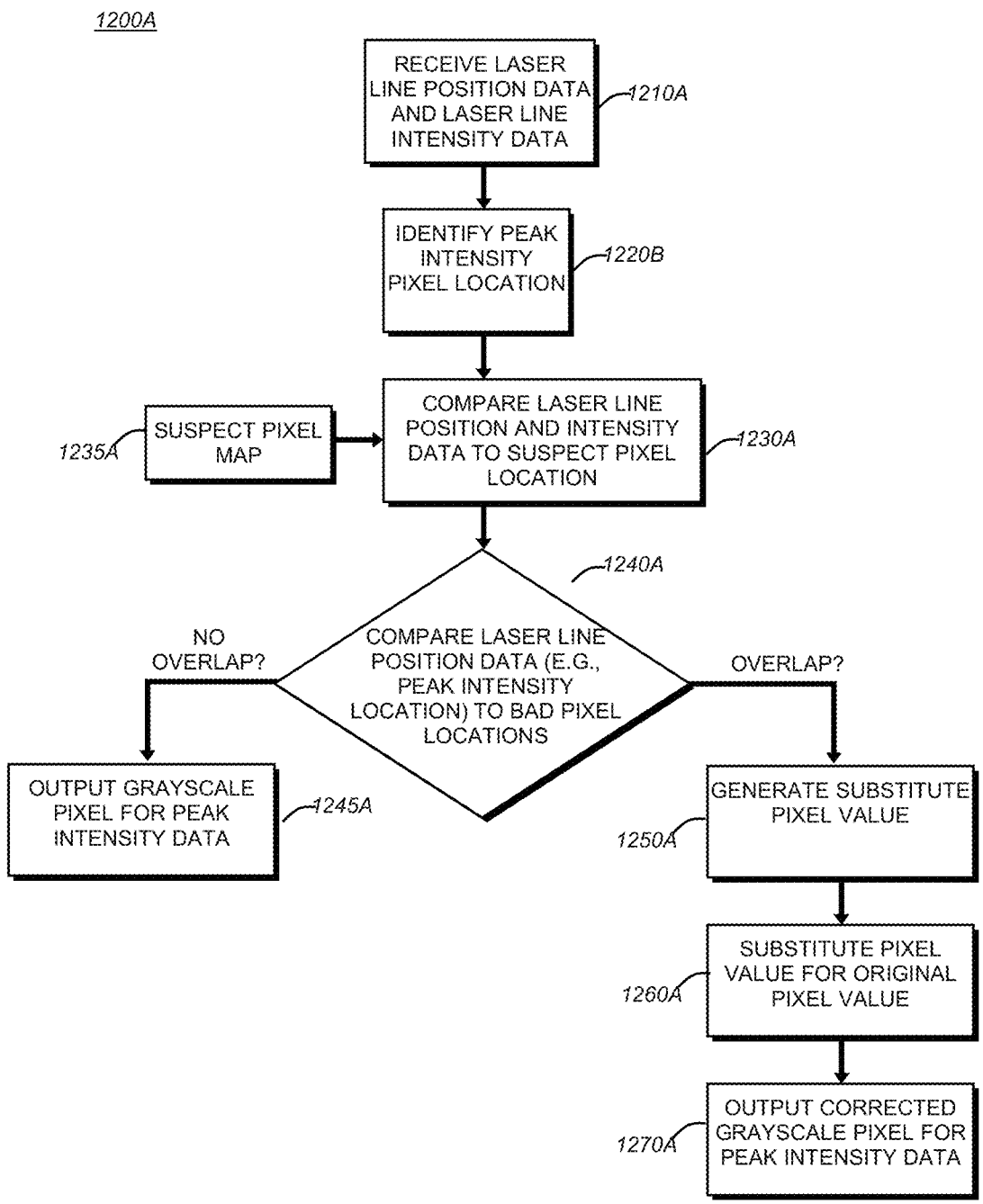
FIG. 12A is a flow diagram of a method for correcting for zero or more suspect pixels in a row of the grayscale image possibly containing suspect pixels.

FIG. 12A is a flow diagram of a method 1200A for correcting for zero or more suspect pixels in a row of the grayscale image possibly containing suspect pixel datum values according to the description above. As an example, the method 1200A may be instantiated at any component within the system, such as the vision system processor 180, sensor process 182, or data handling device/processes 190. The blocks of method 1200A, although depicted below in a certain order, can occur or be performed by one or more processors and in any particular order.

At block 1210A, the laser line peak position data and the corresponding laser line peak intensity data are received or generated. The laser line peak position data and corresponding laser line peak intensity data can be generated as an output of block 430, as described above. The laser line position data and laser line intensity data can each respectively include one or more individual laser line position datum and laser line intensity datum, each having a respective value. At block 1220A, the peak intensity location in the laser line peak intensity data may be identified, as also described above.

At block 1230A, each datum value of the laser line position and intensity data is compared to a suspect pixel map to identify one or more suspect or bad datum values in the laser line intensity data that corresponds to the laser line position data. The location of suspect or bad pixels can be known prior to the imaging process. In this regard, the suspect pixel map can be developed at block 1235A during the calibration process for the imager. The suspect pixel map can pre-identify particular pixels of an imaging device that are known to be suspect or bad pixels. The suspect pixel map can be generated at any time during the process, and in particular can be generated during calibration of the imager. The suspect pixel map can be generated by acquiring one or more images of uniformly bright or dark scenes during a calibration imaging process and identifying pixels that measures values significantly different from nearby sensing elements. Alternatively or additionally can be generated using known suspect pixel information provided by the manufacturer.

At block 1240A, a comparison is made between the peak intensity location identified at block 1220A and the location of any suspect pixel locations. If the peak intensity pixel location is identified that corresponds to, overlaps with, or is within a predetermined proximity of (e.g., within a few pixels), a suspect pixel location, the system can determine that a corrective action should be undertaken to correct the suspect datum value in the laser line intensity data. One such corrective action may include, for example, generating a substitute intensity pixel value at block 1250A and substituting the original intensity datum value corresponding to a suspect pixel location in the imager with the substitute intensity pixel value in the laser line intensity data at block 1260A. The term original value refers to the intensity value provided by the sensor, or processing steps, prior to performing blocks 1250A and/or 1260A, and the term substituted value refers to a new intensity value provided by block 1250A. The substitute pixel value may be computed according to any number of methods. In one example, the substitute pixel value may be computed by taking average values of the intensity of adjacent grayscale pixels, such as a grayscale pixel to the left and a grayscale pixel to the right of the bad pixel. In another example, the substitute pixel value may be a predetermined constant pixel value. In yet another example, a neighborhood-based operation may be performed on surrounding pixel values to determine the substitute pixel value. Such neighborhood-based operation may include any type of calculation performed on pixel values within a predetermined range of the bad pixel. As discussed above, once the substitute pixel value is determined, the substitute pixel value may be substituted in for the value of the original datum value associated with the bad pixel location on the imager. Once substituted, a corrected grayscale pixel for the laser line peak intensity data can be outputted at block 1270A.

If the peak intensity pixel location in the grayscale image does not correspond to, does not overlap with, or is not within a predetermined proximity of (e.g., within a few pixels), a datum value associated with a suspect pixel location, the system can output the grayscale pixel without correction at block 1245A. In another example, the system can alternatively undertake corrective action as shown at blocks 1250A-1270A, despite there being no overlap or correspondence among the peak intensity pixel location and the suspect pixel location.

In another illustrative embodiment, suspect pixel values can be identified from the corresponding height image. For example, if a particular height value differs from its expected height value in the height image by a predetermined threshold, then the corresponding pixel in the grayscale image can be labeled as a suspect pixel. The predetermined threshold of difference between the expected and observed height values can be defined by a user. In another example, the predetermined threshold can be computed as a difference between adjacent pixels.

In another illustrative embodiment, suspect pixel values can be identified from the corresponding height image by pixels for which the height value is missing. For example, if a particular height value is missing from the height image due to laser speckle or occlusion or another cause, then the corresponding pixel in the grayscale image can be labeled as a suspect pixel.

The grayscale image data can be used in a variety of vision system processes such as inspection, registration, print quality analysis, and any other process in which the presence, absence location and/or quality of contrasting elements is analyzed. Notably, the illustrative system employs the same imager, and concurrently acquired image data from the imager, to derive both the height image and grayscale image, so these images are in essentially perfect registration—that is each image pixel of the height image corresponds with the same pixel in the grayscale image. This eliminates the need for a separate camera assemblies to acquire each type of image and the associated need for an alignment step to correspond the features of the height image and grayscale image. The existence of two physically aligned images with different types of data (height and grayscale) allows for application of a variety of vision system tools with both types of data in concert. This increases the usefulness of the overall image data set, allowing for such concurrent operations as registration, pattern matching, etc. using the grayscale image and measurement, inspection, etc. using the height image. Certain similar vision system processes (e.g. inspection) can also be applied to both images to provide a higher level of confidence in the result. For example, a hole is located in the grayscale image and the position of the corresponding height change in the aligned height image is used to verify its location. More generally, the system can provide a measurement process that employs (a) measurements of data from the height image to construct measurements of the grayscale image or (b) measurements of the grayscale image to construct measurements of the height image. A decision-making process (192 in FIG. 1) then generates decisions based upon the measurement process. A variety of decisions can be made in this and other embodiments herein including, but not limited to, object rejection, line stoppage, alarms and alerts

V. Resampling of Grayscale Image to Adjust for Pixel Scale

In some examples, the grayscale image and the height image can have different characteristics that can prevent the useful comparison of the two, or can prevent their simultaneous use in a machine vision task. As discussed above, the grayscale image may be distorted or may have a different pixel scale than the height image. To correct for such differences, the vision system can resample the underlying acquired images, or the laser line position data, laser line intensity data, or bad-pixel-corrected intensity data (as described above), to generate a uniform pixel scaled grayscale image with respect to the height image.

Figure 12B:
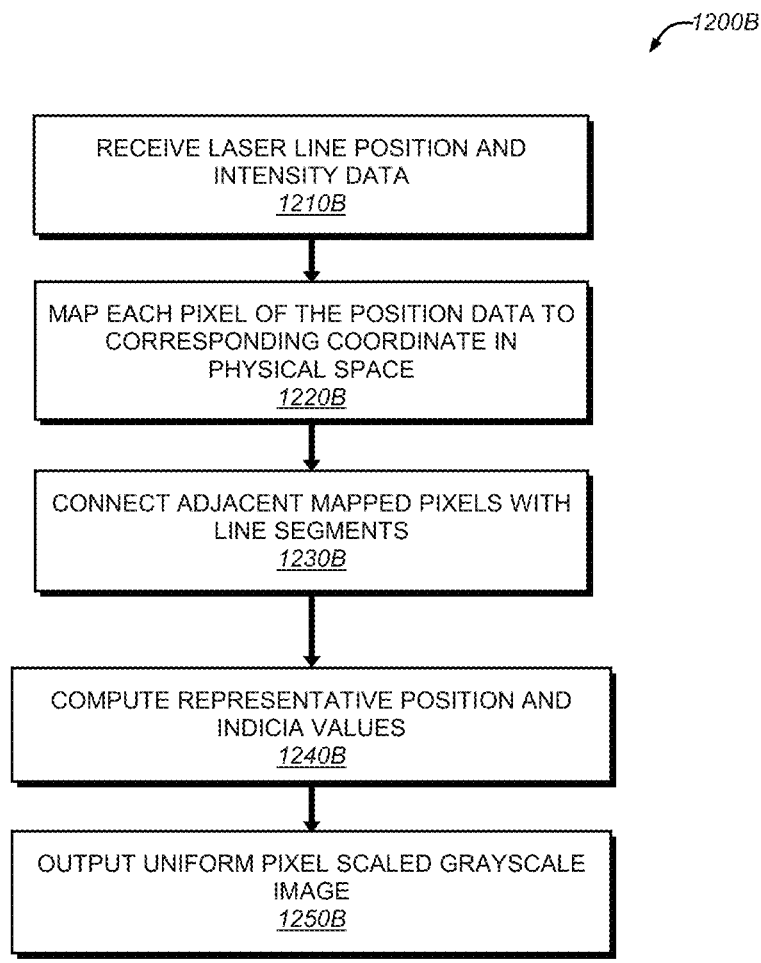
FIG. 12B is a flow diagram of a method for resampling the acquired images, or the laser line position data and laser line intensity data, to generate a grayscale image with a uniform pixel scale.

FIG. 12B is a flow diagram of a method 1200B of resampling the acquired images, or the laser line position data and laser line intensity data to generate a grayscale image with a uniform pixel scale. The resampling method 1200B can be performed as a pre-processing step at the vision system processor 180, or more particularly, the sensor process 182. The blocks of method 1200B, although depicted below in a certain order, can occur or be performed by one or more processors and in any particular order.

At block 1210B, laser line position data 1210C and laser line intensity data 1220C are generated by the system 100 from acquired images. In particular, the laser line position data 1210C and laser line intensity data 1220C can be generated from the acquired images at the vision system processor 180 or the sensor process 182, and may be the output of block 430, as described above, which outputs the laser line intensity data corresponding to the laser line position data. As shown in FIG. 12C, both the laser line position data 1210C and the laser line intensity data 1220C can each be arranged as a row of pixels, but any configuration or orientation of the pixels is contemplated. The row of laser line position data 1210C can include a plurality of pixels, arranged in a row, that correspond to a row of the acquired images acquired by the imager 164 and that has been appended with peak intensity values. The laser line intensity data may include a plurality of pixels, arranged in a row, which corresponds to height image data that has been subject to one or more filters, as has been described above. In one example, the laser line intensity data can correspond to the output of the method 1200A, as also described above. The laser line intensity data 1220C may also include indicia 1230C indicative of albedo values measured at each pixel. For example, an albedo value corresponding to the color blue can be used to indicate a darker grayscale value measured in the laser line intensity data generated from the acquired images. Similarly, an albedo value corresponding to the color red can be used to indicate a brighter grayscale value measured in the laser line intensity data generated from the acquired images. In other examples, other albedo values or colors may be used to signify particular grayscale values in the laser line intensity data.

At block 1220B, each pixel of the row of the laser line position data 1210C is mapped to a corresponding coordinate (x,z) in physical space. In one example, and as shown in FIG. 12D, the mapping can include plot 1240C, which includes the plotted pixels 1250C. Each of the plotted pixels 1250C includes a z coordinate that corresponds to the value of the laser line position data 1210C. In particular, the pixels of the laser line position data 1210C that have a darker shade of gray correspond to a greater z value. More particularly, the calibration processes described above provide a mapping from imager coordinates to physical coordinates. The calibration is used to map from (x,y) imager pixels positions (x=column and y=row) to physical positions (x,z in mm). The laser line position data characterizes the found laser line peak imager y position (row) for each imager x position (column). The calibration is used to map the values in 1210C to the plotted pixels 1250C. In this example, the leftmost pixel of the laser line position data 1210C corresponds to the leftmost plotted pixel 1250C, as do the remainder of the pixels continuing to the right in plotted pixels. In other examples, there may be a pixel offset in the x direction.

At block 1230B, as shown in FIG. 12E, connection features 1260C are constructed to connect the adjacent plotted pixels 1250C. In one example, the connection features 1260C can include line segments, and can include similar indicia 1270C corresponding to the indicia 1230C described with respect to the laser line intensity data 1220C. Similarly, the indicia 1270C may have an albedo value corresponding to the albedo value set forth in the laser line intensity data 1220C. The corresponding albedo values allow the appropriate color to be drawn into the uniform pixel scaled grayscale image at the corresponding location.

At block 1240B, as shown at FIG. 12F, for each bin 1280C having a width parallel to the x-axis, representative position values or range values are computed from the z coordinate values falling within the bin. In one example, the representative position values or range values can include an average. The width of the bin can be determined by any number of factors, including the desired width and resolution of the resulting uniform pixel scaled grayscale image. In this regard, each of the bins 1280C may correspond to zero or more values from the laser line position data 1210C. Each of the values that fall within each respective bin 1280C are averaged to compute an average position value or range value for each bin 1280C. In another example, the computer average position value can be computed from the average range values of the connection features 1260C within each bin.

For each bin 1280C, a representative indicia or albedo value is also computed. In one example, the representative indicia or albedo value can include an average. As discussed above, the connection features 1260C are labeled according to indicia corresponding to certain albedo values. For each bin 1280C, the albedo values that fall within the bin are also averaged to yield an average albedo value for each bin. In another example, the computed average albedo value can be computed from the average albedo values of the connection features within each bin.

At block 1250B, as shown at FIG. 12G, the output 1290C corresponds to the calibrated height image in block 440, which is output in uniform pixel scale. The calibrated height image corresponds to the average position value or average range value computed above. A uniform pixel scaled grayscale image 1295C is also outputted. The uniform pixel scaled grayscale image 1295C includes indicia 1297C corresponding to the average indicia or albedo values previously computed. For example, the indicia 1297C may include the color purple where one of the bins includes a connection feature 1260C that is part red and part blue, with purple being the average of purple and blue. The outputs 1290C and 1295C are now resampled to have the same pixel scale allowing for a pixel-to-pixel comparison to be made among the outputs. This has many advantages and allows for various machine vision tasks to be performed on the images. In one illustrative embodiment, the resampled grayscale image can be generated at different (x,y) scales than the height image. This can be accomplished by performing the various blocks set forth in the method 1200B twice to provide a different x scale. The grayscale image can further be resampled in y to provide a different y scale.

VI. Compensation for False Height Transitions

As shown in the height image 1010 (FIG. 10) above, contrast changes show up as slight false contours (i.e. elements 1060) in the height image. The height measurement is not affected significantly by the absolute albedo of the surface in an area of constant albedo, and thus the central region of each element 940 exhibits approximately the same height reading as the surrounding plate base 930. However, at the edge of the feature 940, when the light-to-dark or dark-to-light transition is passing through the measurement zone, there is an error induced in height measurement.

Figure 13:
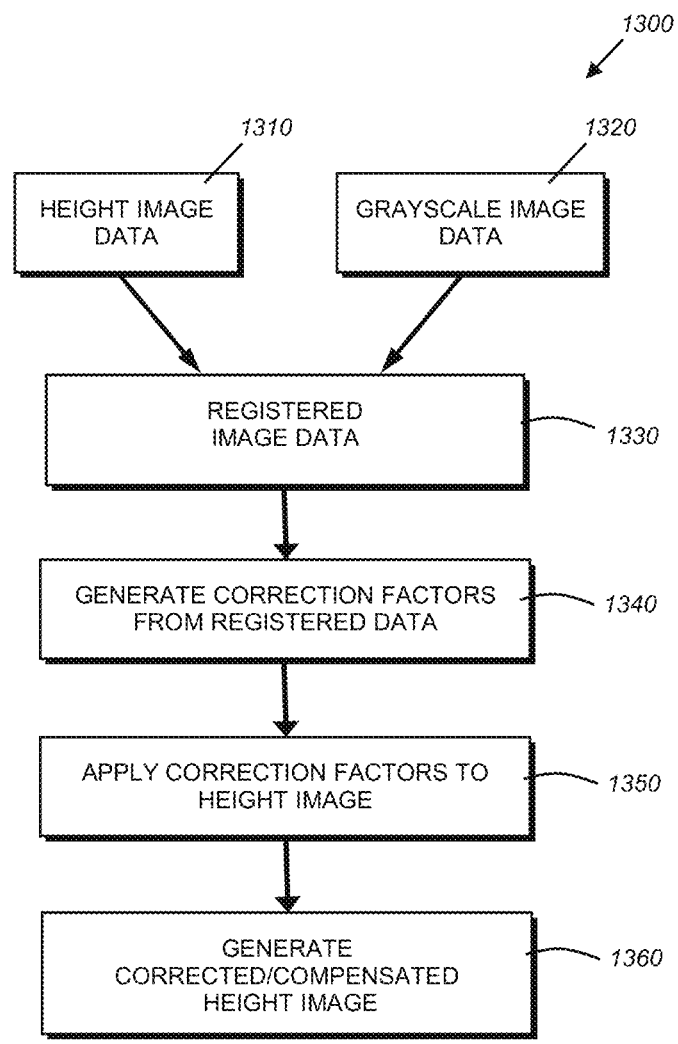
FIG. 13 is a flow diagram showing the compensation for contrast-based false height readings in the height image using a comparison between features of the height image versus corresponding features in the grayscale image.

FIG. 13 shows a generalized procedure 1300 that compensates for such false height transitions. Height image data 1310 and grayscale image data 1320 are each registered (step 1330) so that height correction factors can be generated at each point in the image in step 1340 by the processor. Illustratively, the procedure 1300 operates continuously, using an estimate of the grayscale image gradient in the scan direction to compute the height correction factor(s) that is/are applied at each point in the height image (step 1350). Illustratively, the correction factor can provide a numerical value—for example where zero (0) is no correction to a point in the height image. A zero, or near-zero, correction factor is applied in regions of the height image where the grayscale contrast is not changing. For example, the correction factor is minimal or zero at points residing remote from (and internal of or external of) the edges 1060 of FIG. 10, while a more-significant correction factor is applied at points lying on the edges due to the significant contrast gradient. By applying such correction factors, a corrected/compensated height image is generated in step 1360. This height image omits most or all of the effects of contrast-based false height readings. A variety of techniques can be employed in further embodiments to compensate for false height and other contrast-based effects.

In determining whether false height and/or grayscale features are present, the setup and training of the system can include user-identification of candidate false-features and/or regions containing candidate features. This can speed the analysis of such features and improve throughput of the displacement sensor.

It is expressly contemplated that a runtime (or setup) display (FIG. 6) can be provided to a user showing the above-described height image, grayscale image and corrected/compensated image selectively or in combination(s). Using custom and conventional GUI techniques, the user can be provided with various functions that allow for adjustment of various image parameters and/or characteristics. For example, buttons and setting inputs can be provided on a GUI to enable the user to set and/or adjust thresholds and other image parameters (e.g. sensitivity, display contrast, etc.) based upon the displayed height image, grayscale image and/or corrected/compensated image.

VII. Line-Finding from Column Threshold Pixel Voltages

Figure 14:
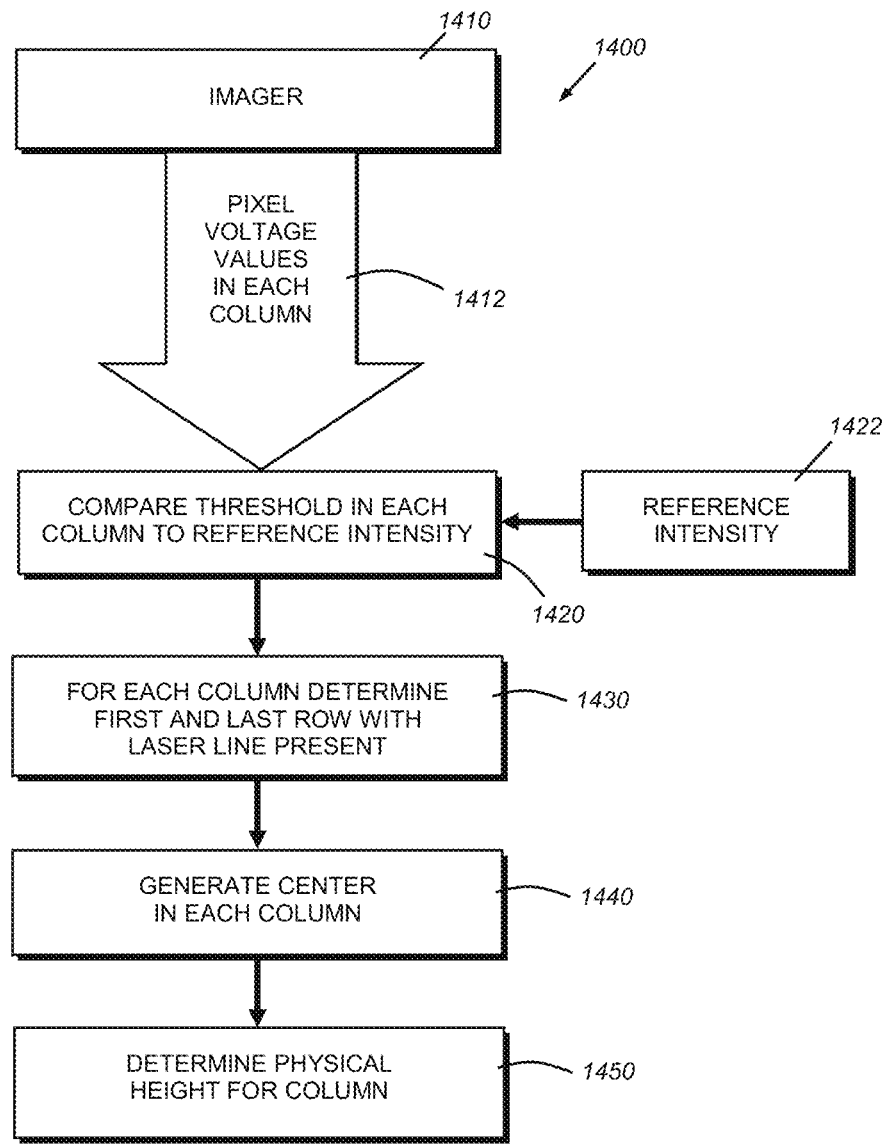
FIG. 14 is a block diagram of a binary technique for determining a center of the laser line in each column by comparing an intensity of each column pixel to a reference intensity.

It is contemplated that processing speed can be increased in various imager arrangements by finding the line center value for each pixel column directly from "binary" pixels that either exceed or fall below a threshold. In this manner, each pixel is delivered to downstream processes/processors as either a logical 1 value (e.g. indicating presence of the laser line) or a 0 value indicating absence of the line at that location in that imager pixel column. FIG. 14, shows an arrangement 1400 in which the imager 1410 outputs intensity values 1412 from the pixels to a circuit (e.g. a comparator circuit) that compares (1420) the intensity of each pixel in a column to reference intensity 1422, and determines which pixels exceed the threshold value established by the reference intensity. The column locations of the first and last pixels in each column that exceed the threshold value (and have a 1 value), and are generally likely to constitute a laser line are determined in block 1430. Note that other pixels in the column at a spacing from a laser line may return a 1 value due to noise, specularity, etc., but the process should filter such pixels as not constituting a group sufficiently large and contiguous (though potentially containing small gaps of 0-value pixels) to define a laser line. Note that the term "intensity" can be defined as a voltage value in various embodiments. That is, while various commercially available CMOS imagers convert the read-out pixel signal of each row from integrated irradiance, to charge, and then to voltage in the readout process, it is contemplated that other imager types could potentially read-out directly in the charge domain directly, or as a current value instead of a voltage value. Thus, the term intensity is meant to define any such signal.

Based upon the first and last pixel location in the column, the process determines the center value in block 1440. This can be accomplished by a specialized hardware circuit or by transmitting the pixel value locations to the vision system processor. It is contemplated, that while a thresholding process is used to locate line pixels in each column for use in constructing the height image, the processor can also receive the intensity value of the pixels (for example in a region of interest) and use such values to construct a slice of a grayscale image of the object surface.

Note that as used herein the generation of a "center" value can employ a variety of techniques that allow for an increase in processing speed versus accuracy—for example, the first value in a column to exceed the threshold in a cluster of over-threshold pixels can be identified as the "center". Thus the term "center", should be taken broadly to include locations along the column within the laser line image that return a predictable result. Illustratively, knowledge of the laser waist size (width) at a given column (x-location) can be used in conjunction with the row location of the first over-threshold pixel to compute the center. For example (in pixels) the following simplified computation can be employed:

Center Location=First Pixel Location+Waist Size/2

VIII. Conclusion

It should be clear that the various embodiments described herein increase the versatility, processing efficiency and throughput speed of laser displacement sensor systems without sacrificing needed accuracy. The illustrative functions described herein can be readily implemented by a user during setup by employing appropriate interfaces, in a straightforward manner. These functions allow for correction of certain inherent errors in height images, such as contrast-based false height readings. Systems and methods are provide to produce registered grayscale images of an object under scan free of the use of a separate camera system and associated processors.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Also, while regions of interest are of constant size and location in the field of view/imager throughout the scan of each object, it is contemplated that the size and/or locations of regions of interest can be varied during the scan to accommodate expected change in locations of feature or change in features of interest along the y-axis. Variation of the regions of interest can occur in response to encoder position or another indication of the relative position of the object with respect to the field of view. In addition, while the terms "row" and "column" are used to describe a particular arrangement of pixels in the imager, it is expressly contemplated that these terms can be interchanged and achieve similar results in accordance with embodiments herein. Also, while a laser is used to generate illumination for acquisition of both the height information/image and grayscale information/image, supplemental illumination can be applied in acquiring the grayscale image—for example, alternating acquisition of the height image and the grayscale image and strobing the supplemental illumination with each grayscale acquisition. Also, while embodiments herein define regions of interest in which processing of image pixels occurs and regions therebetween that are free of processing of image pixels, such intervening regions can be functionally equivalent to one or more "exclusion zones" in which the user defines regions of non-processing, and the system otherwise defaults to performing processing outside such exclusion zone(s). More generally, in embodiments the system and methods define one or more regions of interest and associated exclusion zone(s) allowing for selective detection or non-detection (respectively) of a laser line within the overall imager field of view. Accordingly, this description is meant to be taken only by way of example, and not to otherwise limit the scope of this invention.

What is claimed is:

1. A system for measuring displacement of an object surface comprising:
a displacement sensor that projects a line on the object surface and receives light from the projected line at an imager in a that manner defines a plurality of displacement values in a height direction;
a vision system processor that processes rows of imager pixels at a plurality of discrete resolutions to determine a position of the projected line in columns of the imager pixels, wherein the position of the projected line in each of the columns corresponds to a physical displacement value on the object surface.

2. The system of claim 1, wherein at least one of the rows of imager pixels is processed at a reduced resolution relative to other of the rows of imager pixels.

3. The system of claim 2, wherein the reduced resolution comprises sampling every other row.

4. The system of claim 2, wherein the reduced resolution comprises sampling every third row of imager pixels or every fourth row of imager pixels.

5. The system of claim 1, wherein the at least one of the rows processed at the reduced resolution is a portion of a first line segment.

6. The system of claim 5, wherein the first line segment is closer to the imager than a second line segment.

7. The system of claim 5, wherein the first line segment defines a width crossing one or more rows of imager pixels and the second line segment defines a width crossing a different set of one or more rows of imager pixels.

8. The system of claim 1, wherein at least one of the rows of imager pixels is sampled at a first reduced resolution and a second of the at least one of the rows of imager pixels is sampled at a second reduced resolution.

9. A method of measuring displacement of an object surface comprising;
projecting a line on the object surface;
receiving light from the projected line at an imager in a manner that defines a plurality of displacement values in a height direction; and
processing rows of imager pixels at a plurality of discrete resolutions to determine a position of the projected line in columns of the imager pixels,
wherein the position of the projected line in each of the columns corresponds to a physical displacement value on the object surface.

10. The method of claim 9, wherein at least one of the rows of imager pixels is processed at a reduced resolution relative to other of the rows of imager pixels.

11. The method of claim 10, wherein the reduced resolution comprises sampling every other row.

12. The method of claim 10, wherein the reduced resolution comprises sampling every third row of imager pixels or every fourth row of imager pixels.

13. The method of claim 9, wherein the at least one of the rows processed at the reduced resolution is a portion of a first line segment.

14. The method of claim 13, wherein the first line segment is closer to the imager than a second line segment.

15. The method of claim 14, wherein the first line segment defines a width crossing one or more rows of imager pixels and the second line segment defines a width crossing a different set of one or more rows of imager pixels.

16. The method of claim 9, wherein at least one of the rows of imager pixels is sampled at a first reduced resolution and a second of the at least one of the rows of imager pixels is sampled at a second reduced resolution.

* * * * *